(12) United States Patent
Gao et al.

(10) Patent No.: US 12,094,468 B2
(45) Date of Patent: Sep. 17, 2024

(54) SPEECH DETECTION METHOD, PREDICTION MODEL TRAINING METHOD, APPARATUS, DEVICE, AND MEDIUM

(71) Applicant: Huawei Technologies Co., Ltd., Shenzhen (CN)

(72) Inventors: Yi Gao, Shanghai (CN); Weiran Nie, Shanghai (CN); Youjia Huang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 283 days.

(21) Appl. No.: 17/838,500

(22) Filed: Jun. 13, 2022

(65) Prior Publication Data

US 2022/0310095 A1    Sep. 29, 2022

Related U.S. Application Data

(63) Continuation of application No. PCT/CN2019/125121, filed on Dec. 13, 2019.

(51) Int. Cl.
| | |
|---|---|
| *G10L 15/25* | (2013.01) |
| *G06V 10/82* | (2022.01) |
| *G06V 40/16* | (2022.01) |
| *G10L 15/05* | (2013.01) |
| *G10L 15/26* | (2006.01) |

(52) U.S. Cl.
CPC ............ *G10L 15/25* (2013.01); *G06V 10/82* (2022.01); *G06V 40/172* (2022.01); *G10L 15/05* (2013.01); *G10L 15/26* (2013.01)

(58) Field of Classification Search
CPC ......... G10L 15/25; G10L 15/05; G10L 15/26; G06V 40/172; G06V 10/82

USPC .......................................................... 704/213
See application file for complete search history.

(56) References Cited

U.S. PATENT DOCUMENTS

| | | | |
|---|---|---|---|
| 9,215,543 B2 | 12/2015 | Sun et al. | |
| 9,437,186 B1 | 9/2016 | Liu et al. | |
| 10,360,926 B2 | 7/2019 | Mortensen et al. | |
| 2013/0124207 A1 | 5/2013 | Sarin et al. | |
| 2016/0189733 A1 | 6/2016 | Vasilieff et al. | |
| 2018/0268812 A1* | 9/2018 | Kim | ........................ G10L 15/22 |

(Continued)

FOREIGN PATENT DOCUMENTS

| | | |
|---|---|---|
| CN | 102682273 A | 9/2012 |
| CN | 103617801 A | 3/2014 |

(Continued)

OTHER PUBLICATIONS

S. Petridis and M. Pantic, "Prediction-Based Audiovisual Fusion for Classification of Non-Linguistic Vocalisations," in IEEE Transactions on Affective Computing, vol. 7, No. 1, pp. 45-58, Jan. 1-Mar. 2016, doi: 10.1109/TAFFC.2015.2446462.keywords: {Visualization; Predictive models; Speech; Correlation (Year: 2016).*

(Continued)

*Primary Examiner* — Bharatkumar S Shah
(74) *Attorney, Agent, or Firm* — Conley Rose, P.C.

(57) ABSTRACT

A speech detection method includes performing recognition on a photographed face image using a model to predict whether a user intends to continue speaking, and to determine whether a collected audio signal is a speech end point with reference to a prediction result.

20 Claims, 15 Drawing Sheets

(56) References Cited

U.S. PATENT DOCUMENTS

| | | | |
|---|---|---|---|
| 2019/0057716 | A1 | 2/2019 | Vasilieff et al. |
| 2020/0051565 | A1* | 2/2020 | Singh .................. G10L 15/02 |
| 2020/0320571 | A1* | 10/2020 | Singh .................. G06N 20/00 |
| 2020/0365173 | A1 | 11/2020 | Fang et al. |
| 2022/0182578 | A1 | 6/2022 | Sircar |

FOREIGN PATENT DOCUMENTS

| | | | |
|---|---|---|---|
| CN | 103745723 | A | 4/2014 |
| CN | 107679506 | A | 2/2018 |
| CN | 108257616 | A | 7/2018 |
| CN | 108573701 | A | 9/2018 |
| CN | 109509471 | A | 3/2019 |
| CN | 109817211 | A | 5/2019 |
| CN | 110033790 | A | 7/2019 |
| CN | 110265065 | A | 9/2019 |
| CN | 110534109 | A | 12/2019 |
| WO | 2005114576 | A1 | 12/2005 |

OTHER PUBLICATIONS

Sharma, R., et al., "Toward Visual Voice Activity Detection for Unconstrained Videos", ICIP 2019, 5 Pages.

Sharma, R., et al., "Toward Visual Voice Activity Detection for Unconstrained Videos", 2019 IEEE International Conference on Image Processing (ICIP), IEEE, Sep. 22, 2019, XP033647160, pp. 2991-2995.

Chen, Q., "Voice endpoint detection based on audio and visual features", Guizhou University, Issue 05, 2007, with an English abstract, total 68 pages.

* cited by examiner ( There is an intention of
continuing speaking
(Think before speaking) )

← An output status of voice activity detection (VAD) changes from speech (Speech) to silence (Silence)
Silence duration meets the following:
First threshold (Dmax) > Duration (Duration) > Second threshold (Dmin), and then the status changes from silence to speech
← Recognition on a combination of two segments of speech and recognition on each of the two segments of speech
First confidence degree ($Conf_{merge}$) > Second confidence degree or third confidence Degree ($Conf_{Split i}$)
← Through syntax analysis, a confidence degree of a sentence into which the two segments of speech is combined is greater than a confidence degree of each of the two segments
← There is recognition output of an action unit, that is:
Probability ($PAU_i$) output by a first classifier > Probability (PNEU) output by a second classifier

FIG. 3

( There is no intention of
continuing speaking
(Neutral) )

← An output status of VAD changes from silence (a silent state) to speech (a speaking state)
Silence duration meets the following:
Duration (Duration) > First threshold (Dmax)

FIG. 4

CONT.
FROM
FIG. 10A

CONT.
FROM
FIG. 10A

1008: Perform speech recognition on the audio signal to obtain third text information corresponding to the audio signal, and detect trailing silence duration of the audio signal 1009: Compare the trailing silence duration with a corresponding threshold 1010: If the trailing silence duration is greater than a third threshold, perform syntax analysis on the third text information to obtain a first analysis result 1011: Determine whether the first analysis result indicates that the third text information is a complete statement 1012: If the first analysis result indicates that the third text information is a complete statement, input the face image into the prediction model 1013: Process the face image by using the prediction model, and output a prediction result 1014: If the prediction result indicates that a user does not intend to continue speaking, determine that the audio signal is a speech end point

FIG. 10B

SPEECH DETECTION METHOD, PREDICTION MODEL TRAINING METHOD, APPARATUS, DEVICE, AND MEDIUM

CROSS-REFERENCE TO RELATED APPLICATIONS

This is a continuation of International Patent Application No. PCT/CN2019/125121 filed on Dec. 13, 2019, which is hereby incorporated by reference in its entirety.

TECHNICAL FIELD

This disclosure relates to the field of speech interaction technologies, and in particular, to a speech detection method, a prediction model training method, an apparatus, a device, and a medium.

BACKGROUND

In a speech interaction technology, to implement a speech-based man-machine interaction function, usually, a speech start point and speech end point in a segment of speech are identified, a part between the speech start point and the speech end point is captured as a voice instruction, and a device is instructed to perform a corresponding operation based on the voice instruction. The speech start point is usually triggered by a proactive operation of a user, and is easily determined by using data such as a collection time point of a wakeup keyword or an operation trigger time point of a speech interaction start option. The speech end point needs to be obtained through speech analysis processing by the device. It can be learned that, for the speech interaction technology, how to accurately detect the speech end point is of great importance, and is also a considerable technical difficulty.

In a related technology, a speech detection method is usually as follows: in each time window, collecting an audio signal in the current time window, detecting trailing silence duration of the audio signal, comparing the trailing silence duration with a silence duration threshold, and if the trailing silence duration is greater than the silence duration threshold, determining that the audio signal is a speech end point, or if the trailing silence duration is less than or equal to the silence duration threshold, determining that the audio signal is not a speech end point.

When the foregoing method is used for speech end point detection, once background noise is comparatively strong, detected trailing silence duration of an audio signal is greater than accurate trailing silence duration. As a result, a speech end point is easily missed, leading to delayed detection of an ended state of speech interaction. Moreover, once a user pauses during speech, detected trailing silence duration of an audio signal is less than accurate trailing silence duration, leading to premature detection of an ended state of speech interaction. It can be learned that accuracy of a speech end point detected by using the method is comparatively low.

SUMMARY

Embodiments of this disclosure provide a speech detection method, a prediction model training method, an apparatus, a device, and a medium, so as to improve accuracy of speech end point detection.

According to a first aspect, a speech detection method is provided. In the method, an audio signal and a face image may be obtained, where a photographing time point of the face image is the same as a collection time point of the audio signal. The face image is input into a prediction model, where the prediction model is used to predict whether a user intends to continue speaking. The face image is processed by using the prediction model, and a prediction result is output. If the prediction result indicates that the user does not intend to continue speaking, it is determined that the audio signal is a speech end point.

The foregoing provides a multi-modal speech end point detection method. Recognition is performed on the photographed face image by using the model, so as to predict whether the user intends to continue speaking. Whether the collected audio signal is the speech end point is determined with reference to the prediction result. Because detection is performed not only based on an acoustic feature but also based on a visual-modal feature such as the face image, even if background noise is strong or the user pauses during speech, whether a speech signal is the speech end point can still be accurately determined by using the face image. Therefore, interference caused by background noise and a pause in speech is avoided, to avoid a problem, of delayed or premature detection of an ended state of speech interaction, resulting from interference caused by background noise and a pause in speech. This improves accuracy of speech end point detection, and further improves speech interaction efficiency. In addition, because a problem that speech end point detection is inaccurate during speech interaction is resolved, a problem that a response delay is excessively long because of delayed detection of a speech end point is avoided. This shortens a speech interaction delay, improves speech interaction smoothness, and avoids a problem that a voice instruction is prematurely truncated because of premature detection of a speech end point. Therefore, misunderstanding of a user intention is avoided, and speech interaction accuracy is improved.

Optionally, in a process of processing the face image by the prediction model, a key point included in the face image may be extracted, the key point is processed, to obtain action features of the face image, the action features are classified, to obtain confidence degrees that respectively correspond to different types, and the prediction result is determined based on the confidence degrees.

If a segment of speech includes a pause, during speech syntax analysis, whether an audio signal is the pause or a speech end point cannot be determined. In this optional manner, a key-point feature and action features of a face are incorporated, so that a micro-expression included on the face can be accurately identified based on a current action of the face, so as to deduce a mental state of the user based on the expression, and further predict whether the user intends to continue speaking. According to this method, visual information is used to assist in determining, thereby resolving a problem that cannot be resolved in syntax analysis, and reducing premature truncation of speech.

Optionally, the prediction model is obtained through training based on a first sample face image and a second sample face image. The first sample face image is marked with a first label. The first label indicates that a sample user intends to continue speaking. The first label is determined based on a first sample audio signal. A collection time point and a collection object of the first sample audio signal are the same as a photographing time point and a photographing object of the first sample face image. The second sample face image is marked with a second label. The second label indicates that the sample user does not intend to continue speaking. The second label is determined based on a second sample audio signal. A collection time point and a collection object of the second sample audio signal are the same as a photographing time point and a photographing object of the second sample face image.

In this optional manner, a model training method for implementing a user intention prediction function is provided. Model training is performed by using the sample face image that contains a user intention of continuing speaking and the sample face image that contains a user intention of not continuing speaking. Through a training process, the prediction model can learn, from the sample face image that contains the user intention of continuing speaking and the corresponding label, what a face image feature is like when the user intends to continue speaking, and learn, from the sample face image that contains the user intention of not continuing speaking and the corresponding label, what a face image feature is like when the user does not intend to continue speaking. Because the prediction model learns a correspondence between a user intention and a face image feature, in a model application phase, whether a current user intends to continue speaking can be predicted based on an unknown face image by using the model, so that whether a current speech signal is a speech end point is accurately detected based on a user intention indicated by the face image.

Optionally, the first sample audio signal meets a first condition. The first condition includes updating a voice activity detection (VAD) result corresponding to the first sample audio signal from a speaking state to a silent state, and then updating from the silent state to the speaking state.

If the sample user pauses for a short time during speech, in this scenario, in a process of performing VAD on audio collected during the speech, for before-pause audio, a VAD result is the speaking state, for during-pause audio, the VAD result is the silent state, for after-pause audio, the VAD result changes back to the speaking state. If a collected sample audio signal meets the first condition (1), it indicates that the sample audio signal is consistent with the during-pause audio in this scene. After the pause, the sample user continues speaking instead of ending the speech. Therefore, at a pause time point, the sample user intends to continue speaking. In this case, a sample face image photographed at the pause time point contains the user intention of continuing speaking. The sample face image is marked as the first face image, so that the model can subsequently learn, by using the first sample face image, a mapping relationship between a face image and the user intention of continuing speaking. In this way, in the model application phase, whether a current user intends to continue speaking can be predicted based on an unknown face image by using the model.

Optionally, the first sample audio signal meets a first condition. The first condition is met when a silence duration of the first sample audio signal is less than a first threshold and greater than a second threshold, where the first threshold is greater than the second threshold.

Optionally, the first sample audio signal meets a first condition. The first condition is met when a first confidence degree of a text information combination is greater than a second confidence degree of first text information, where the text information combination is a combination of the first text information and second text information, the first text information indicates semantics of a previous sample audio signal of the first sample audio signal, the second text information indicates semantics of a next sample audio signal of the first sample audio signal, the first confidence degree indicates a probability that the text information combination is a complete statement, and the second confidence degree indicates a probability that the first text information is a complete statement.

Optionally, the first sample audio signal meets a first condition. The first condition is met when a first confidence degree of the text information combination is greater than a third confidence degree of the second text information, where the third confidence degree indicates a probability that the second text information is a complete statement.

An effect achieved by using the first condition may include at least the following. For a sentence that includes a short pause, in a related technology, the complete sentence is split into two segments of speech by using a pause point as a separation point. Before a user finishes speaking, an electronic device prematurely determines that a speech end point is already detected, resulting in premature detection of a speech end point. In this case, the electronic device directly uses before-pause audio as a voice instruction, and ignores after-pause audio. As a result, the recognized voice instruction is incomplete. If the electronic device directly performs service processing based on the before-pause voice instruction, accuracy of service processing is undoubtedly affected. By contrast, according to the foregoing method, two segments of audio signals can be comprehensively considered. To be specific, recognition is not only performed on each of the two segments of audio signals to obtain a confidence degree that each of sentence segments corresponding to the two segments of audio signals is a complete statement, but also performed on an entirety including the plurality of segments of audio signals, to obtain a confidence degree that the entirety including the two sentence segments is a complete statement. If the confidence degree that the entirety is a complete statement is greater than the confidence degree that each of the two sentence segments is a complete statement, a sample face image corresponding to a silence segment between the two sentence segments is extracted and marked as the first sample face image, so that the model can use the marked first sample face image to learn a feature that a face image includes during a pause.

Optionally, the first sample face image meets a third condition. The third condition is met when after the first sample face image is separately input into a first classifier in the prediction model and a second classifier in the prediction model, a probability output by the first classifier is greater than a probability output by the second classifier, where the first classifier is configured to predict a probability that a face image includes an action, and the second classifier is configured to predict a probability that the face image does not include an action.

Using the third condition can incorporate multi-modal information, such as a photographed face image, a collected audio signal, and semantics of text information, so as to automatically mark training data with reference to global information. Because information of all modalities is comprehensively considered, this can ensure that a label of a sample face image matches a user intention of whether to continue speaking. In this way, a marked sample has high accuracy, so that user intention prediction accuracy is also comparatively high after the model is trained based on the accurate sample. Therefore, this helps to accurately detect a speech end point in the model application phase.

Optionally, the second sample audio signal meets a second condition. The second condition includes at least one of the following. A VAD result corresponding to the second sample audio signal is updated from the speaking state to the silent state, or trailing silence duration of the second sample audio signal is greater than the first threshold.

According to the second condition, whether a face image contains the user intention of not continuing speaking can be determined by using an audio signal collected during face image photographing, so as to mark a training image based on acoustic-modal information. This can ensure that a label of a sample face image matches a user intention of whether to continue speaking. In this way, a marked sample has high accuracy, so that user intention prediction accuracy is also comparatively high after the model is trained based on the accurate sample. Therefore, this helps to accurately detect a speech end point in the model application phase.

Optionally, a text-modal feature may also be incorporated for speech detection. Further, speech recognition may be performed on the audio signal to obtain third text information corresponding to the audio signal. Syntax analysis is performed on the third text information to obtain a first analysis result. The first analysis result is used to indicate whether the third text information is a complete statement. If the first analysis result indicates that the third text information is not a complete statement, it is determined that the audio signal is not the speech end point, or if the first analysis result indicates that the third text information is a complete statement, the step of inputting the face image into a prediction model is performed.

Incorporating a text-modal feature for speech detection can achieve at least the following effects. Syntactic completeness of a statement that includes a current word and a previous word cannot be used as an only basis for determining that the current word is a speech end point. If the method provided in the related technology is implemented, that is, only acoustic information is used as a basis, a pause point may be mistakenly determined as a speech end point when a temporary pause is detected. As a result, a voice instruction is split, leading to distortion of a user intention, and causing a task processing error of speech interaction. By contrast, according to the foregoing method, a procedure of performing facial recognition by applying the prediction model may be triggered when it is detected that syntax of the audio signal is complete, so as to further determine, by using the prediction result, whether the audio signal actually reaches the speech end point. In this way, a case of mistaken determining in syntax analysis is avoided by incorporating a visual-modal feature. This greatly improves accuracy of speech end point detection, and reduces a probability that a voice instruction is prematurely truncated. In addition, the foregoing syntax analysis method does not depend on a specific automatic speech recognition (ASR) engine or a specific scenario, detection for each modality may be independently performed, and determining is performed comprehensively based on all modalities. This is more operable and highly practical.

Optionally, a syntax analysis process may include performing word segmentation on the third text information to obtain a plurality of words, for each of the plurality of words, performing syntax analysis on the words to obtain a second analysis result corresponding to the word, where the second analysis result is used to indicate whether the word and a previous word of the word form a complete statement, and if a second analysis result corresponding to any one of the plurality of words indicates that a complete statement is formed, determining that the third text information is a complete statement, or if a second analysis result corresponding to each of the plurality of words indicates that no complete statement is formed, determining that the third text information is not a complete statement.

An effect achieved through syntax analysis by performing the foregoing steps may include at least the following. Not only a syntactic relationship between each word and a previous word is comprehensively considered, but also an N-best algorithm is used. Each time a word is detected, whether the word and a previous word form a complete statement is determined. Once a current word indicates that a complete statement is formed, it may be determined that analyzed text information is a complete statement, and a next-step detection procedure may be performed. In this way, when a current audio signal has a probability of being a speech end point, the speech end point can be detected in a timely manner. This ensures real-time detection of a speech end point, and avoids delayed detection of a speech end point.

Optionally, a trigger condition for inputting the face image into the prediction model includes detecting a trailing silence duration of the audio signal, and determining that the trailing silence duration is greater than a third threshold.

According to the trigger condition, a procedure of performing speech detection by using a face image feature may be performed when the trailing silence duration is between the third threshold and the first threshold. An effect achieved in this manner may include at least the following. Once the silence duration is greater than a minimum threshold (the third threshold), speech end point detection is performed by using a syntax analysis result and a face analysis result with reference to a text modality and an image modality, so that a speech endpoint is detected as quickly and accurately as possible by using a combination of multi-modal information. This avoids a case of an excessively long delay.

Optionally, the foregoing speech detection method may be applied to a vehicle-mounted terminal. The vehicle-mounted terminal may further collect driving status information, where the driving status information indicates a driving status of a vehicle with the vehicle-mounted terminal, collect driving status information, where the driving status information indicates a driving status of a vehicle with the vehicle-mounted terminal, and adjust the third threshold based on the driving status information.

An effect achieved in the foregoing manner may include at least the following. Endpoint detection may be performed based on a specific application scenario of speech detection. For example, when speech detection is applied in an in-vehicle scenario, the trailing silence duration threshold may be adjusted based on a driving status in a driving process, so that the threshold can be adaptively adjusted based on the current driving status. This improves robustness of speech endpoint detection.

Optionally, a process of adjusting the third threshold may include adjusting the third threshold if the driving status information indicates that a sharp turn occurs, where an adjusted third threshold is greater than the before-adjustment third threshold, or adjusting the third threshold if the driving status information indicates that abrupt braking occurs, where an adjusted third threshold is greater than the before-adjustment third threshold.

An effect achieved in the foregoing manner may include at least the following. If a vehicle sharply turns or abruptly brakes, speech of a user is likely to be interrupted due to the sharp turn or abrupt braking. As a result, a probability that a speech end point appears is increased, and speech interruption duration is correspondingly prolonged. In this case, an adjusted threshold can be adapted to a sharp turn or abrupt braking status by increasing the trailing silence duration threshold.

Endpoint detection may be performed based on a specific application scenario of speech detection. For example, when speech detection is applied in an in-vehicle scenario, the trailing silence duration threshold may be adjusted based on a driving status in a driving process, so that the threshold can be adaptively adjusted based on the current driving status. This improves robustness of speech endpoint detection.

Optionally, the foregoing speech detection method may be applied to a vehicle-mounted terminal. The vehicle-mounted terminal may further collect environment information, where the environment information indicates an environment in which a vehicle with the vehicle-mounted terminal is located, and adjust a parameter of the prediction model based on the environment information.

An effect achieved through parameter adjustment with reference to the out-of-vehicle environment may include at least the following. In a vehicle driving process, the out-of-vehicle environment affects emotion of a driver, and a change in emotion affects a facial recognition process. In this case, the parameter of the prediction model is adjusted with reference to the out-of-vehicle environment, so that a process of performing facial recognition by the prediction model can match the current out-of-vehicle environment. This improves prediction result accuracy of the prediction model.

Optionally, a process of adjusting the parameter of the prediction model may include, if the environment information indicates that a traffic jam occurs, adjusting a decision threshold of a third classifier in the prediction model, where the third classifier is configured to determine, when input data is greater than the decision threshold, that the user intends to continue speaking, or determine, when input data is less than or equal to the decision threshold, that the user does not intend to continue speaking.

An effect achieved in the foregoing manner may include at least the following. A probability that a driver is irritated in a traffic jam scenario is higher than a probability that the driver is irritated in a traffic flowing scenario, and a change in emotion affects a facial recognition process. In this case, the parameter of the prediction model is adjusted with reference to a traffic status, so that a process of performing facial recognition by the prediction model can match the current traffic status. This improves prediction result accuracy of the prediction model.

According to a second aspect, a method for training a prediction model used for speech detection is provided. In the method, a sample audio signal set and a to-be-marked sample face image set may be obtained. A third sample face image in the sample face image set is processed based on a first sample audio signal in the sample audio signal set, to obtain a first sample face image, where the first sample face image is marked with a first label, and the first label indicates that a sample user intends to continue speaking. A photographing time point and a photographing object of the first sample face image are the same as a collection time point and a collection object of the first sample audio signal. A fourth sample face image in the sample face image set is processed based on a second sample audio signal in the sample audio signal set, to obtain a second sample face image, where the second sample face image is marked with a second label, and the second label indicates that the sample user does not intend to continue speaking. A photographing time point and a photographing object of the second sample face image are the same as a collection time point and a collection object of the second sample audio signal. Model training is performed by using the first sample face image and the second sample face image, to obtain a prediction model, where the prediction model is used to predict whether the user intends to continue speaking.

Optionally, the first sample audio signal meets a first condition. The first condition includes at least one of the following. A VAD result corresponding to the first sample audio signal is first updated from a speaking state to a silent state, and then updated from the silent state to the speaking state, or trailing silence duration of the first sample audio signal is less than a first threshold and greater than a second threshold, where the first threshold is greater than the second threshold, or a first confidence degree of a text information combination is greater than a second confidence degree of first text information, where the text information combination is a combination of the first text information and second text information, the first text information indicates semantics of a previous sample audio signal of the first sample audio signal, the second text information indicates semantics of a next sample audio signal of the first sample audio signal, the first confidence degree indicates a probability that the text information combination is a complete statement, and the second confidence degree indicates a probability that the first text information is a complete statement, or the first confidence degree of the text information combination is greater than a third confidence degree of the second text information, where the third confidence degree indicates a probability that the second text information is a complete statement.

Optionally, the second sample audio signal meets a second condition. The second condition includes at least one of the following. A VAD result corresponding to the second sample audio signal is updated from the speaking state to the silent state, or trailing silence duration of the second sample audio signal is greater than the first threshold.

Optionally, the first sample face image meets a third condition. The third condition is met when after the first sample face image is input into a first classifier in the prediction model and a second classifier in the prediction model, a probability output by the first classifier is greater than a probability output by the second classifier, where the first classifier is configured to predict a probability that a face image includes an action, and the second classifier is configured to predict a probability that the face image does not include an action.

According to a third aspect, a speech detection apparatus is provided. The speech detection apparatus has a function of implementing speech detection in any one of the first aspect or the optional manners of the first aspect. The speech detection apparatus includes at least one module, and the at least one module is configured to implement the speech detection method provided in any one of the first aspect or the optional manners of the first aspect.

Optionally, a trigger condition for inputting the face image into a prediction model includes detection of a trailing silence duration of the audio signal, and determining that the trailing silence duration is greater than a third threshold.

Optionally, the apparatus is applied to a vehicle-mounted terminal. The apparatus further includes a first collection module, configured to collect driving status information, where the driving status information indicates a driving status of a vehicle with the vehicle-mounted terminal, and a first adjustment module, configured to adjust the third threshold based on the driving status information.

Optionally, the first adjustment module is configured to adjust the third threshold if the driving status information indicates that a sharp turn occurs, where an adjusted third threshold is greater than the before-adjustment third threshold.

Optionally, the first adjustment module is configured to adjust the third threshold if the driving status information indicates that abrupt braking occurs, where an adjusted third threshold is greater than the before-adjustment third threshold.

Optionally, the apparatus is applied to a vehicle-mounted terminal. The apparatus further includes a second collection module, configured to collect environment information, where the environment information indicates an environment in which a vehicle with the vehicle-mounted terminal is located, and a second adjustment module, configured to adjust a parameter of the prediction model based on the environment information.

Optionally, the second adjustment module is configured to, if the environment information indicates that a traffic jam occurs, adjust a decision threshold of a third classifier in the prediction model. The third classifier is configured to determine, when input data is greater than the decision threshold, that a user intends to continue speaking, or determine, when input data is less than or equal to the decision threshold, that a user does not intend to continue speaking.

According to a fourth aspect, an apparatus for training a prediction model used for speech detection is provided. The apparatus includes an obtaining module, configured to obtain a sample audio signal set and a to-be-marked sample face image set, a processing module, configured to process a third sample face image in the sample face image set based on a first sample audio signal in the sample audio signal set, to obtain a first sample face image, where the first sample face image is marked with a first label, the first label indicates that a sample user intends to continue speaking, and a photographing time point and a photographing object of the first sample face image are the same as a collection time point and a collection object of the first sample audio signal, where the processing module is further configured to process a fourth sample face image in the sample face image set based on a second sample audio signal in the sample audio signal set, to obtain a second sample face image, where the second sample face image is marked with a second label, the second label indicates that the sample user does not intend to continue speaking, and a photographing time point and a photographing object of the second sample face image are the same as a collection time point and a collection object of the second sample audio signal, and a training module, configured to perform model training by using the first sample face image and the second sample face image, to obtain a prediction model, where the prediction model is used to predict whether the user intends to continue speaking.

Optionally, the first sample audio signal meets a first condition. The first condition includes at least one of the following: a VAD result corresponding to the first sample audio signal is first updated from a speaking state to a silent state, and then updated from the silent state to the speaking state, or trailing silence duration of the first sample audio signal is less than a first threshold and greater than a second threshold, where the first threshold is greater than the second threshold, or a first confidence degree of a text information combination is greater than a second confidence degree of first text information, where the text information combination is a combination of the first text information and second text information, the first text information indicates semantics of a previous sample audio signal of the first sample audio signal, the second text information indicates semantics of a next sample audio signal of the first sample audio signal, the first confidence degree indicates a probability that the text information combination is a complete statement, and the second confidence degree indicates a probability that the first text information is a complete statement, or the first confidence degree of the text information combination is greater than a third confidence degree of the second text information, where the third confidence degree indicates a probability that the second text information is a complete statement.

Optionally, the second sample audio signal meets a second condition. The second condition includes at least one of the following: a VAD result corresponding to the second sample audio signal is updated from the speaking state to the silent state, or trailing silence duration of the second sample audio signal is greater than the first threshold.

Optionally, the first sample face image meets a third condition. The third condition includes the following, after the first sample face image is input into a first classifier in the prediction model and a second classifier in the prediction model, a probability output by the first classifier is greater than a probability output by the second classifier, where the first classifier is configured to predict a probability that a face image includes an action, and the second classifier is configured to predict a probability that the face image does not include an action.

According to a fifth aspect, an electronic device is provided. The electronic device includes a processor. The processor is configured to execute an instruction, so that the electronic device performs the speech detection method provided in any one of the first aspect or the optional manners of the first aspect. For specific details of the electronic device provided in the fifth aspect, refer to any one of the first aspect or the optional manners of the first aspect. Details are not described herein again.

According to a sixth aspect, an electronic device is provided. The electronic device includes a processor. The processor is configured to execute an instruction, so that the electronic device performs the method for training a prediction model used for speech detection provided in any one of the second aspect or the optional manners of the second aspect. For specific details of the electronic device provided in the sixth aspect, refer to any one of the second aspect or the optional manners of the second aspect. Details are not described herein again.

According to a seventh aspect, a computer-readable storage medium is provided. The storage medium stores at least one instruction. The instruction is read by a processor, so that an electronic device performs the speech detection method provided in any one of the first aspect or the optional manners of the first aspect.

According to an eighth aspect, a computer-readable storage medium is provided. The storage medium stores at least one instruction. The instruction is read by a processor, so that an electronic device performs the method for training a prediction model used for speech detection provided in any one of the second aspect or the optional manners of the second aspect.

According to a ninth aspect, a computer program product is provided. When the computer program product is run on an electronic device, the electronic device is enabled to perform the speech detection method provided in any one of the first aspect or the optional manners of the first aspect.

According to a tenth aspect, a computer program product is provided. When the computer program product is run on an electronic device, the electronic device is enabled to perform the method for training a prediction model used for speech detection provided in any one of the second aspect or the optional manners of the second aspect.

According to an eleventh aspect, a chip is provided. When the chip is run on an electronic device, the electronic device is enabled to perform the speech detection method provided in any one of the first aspect or the optional manners of the first aspect.

According to a twelfth aspect, a chip is provided. When the chip is run on an electronic device, the electronic device is enabled to perform the method for training a prediction model used for speech detection provided in any one of the second aspect or the optional manners of the second aspect.

BRIEF DESCRIPTION OF DRAWINGS

FIG. 3 is a schematic diagram of a condition that needs to be met for marking with a first label according to an embodiment of this disclosure;

FIG. 4 is a schematic diagram of a condition that needs to be met for marking with a second label according to an embodiment of this disclosure;

FIG. 10A and FIG. 10B are a flowchart of a speech detection method in an in-vehicle scenario according to an embodiment of this disclosure;

DESCRIPTION OF EMBODIMENTS

Figure 1:
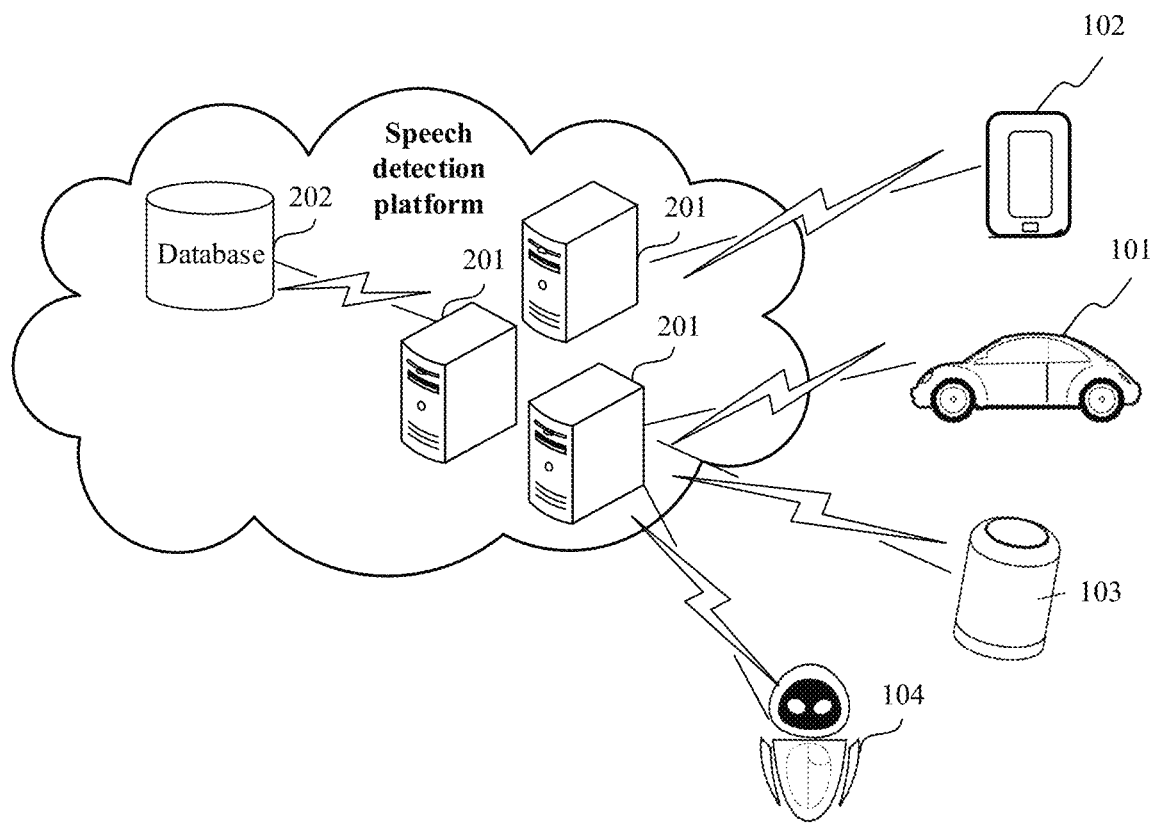
FIG. 1 is a schematic diagram of an implementation environment of a speech detection method according to an embodiment of this disclosure.

To make objectives, technical solutions, and advantages of this disclosure clearer, the following further describes implementations of this disclosure in detail with reference to the accompanying drawings.

The term "at least one" in this disclosure means one or more, and the term "a plurality of" in this disclosure means two or more. For example, "a plurality of second packets" means two or more second packets. The terms "system" and "network" are usually used interchangeably in this specification.

In this disclosure, the terms "first", "second", and the like are used to distinguish between same or similar items whose effects and functions are basically the same. It should be understood that there is no logical or time-sequence dependency between "first", "second", and "$n^{th}$", and a quantity and an execution sequence are not limited, either.

It should be understood that sequence numbers of processes do not mean an execution sequence in embodiments of this disclosure. The execution sequence of the processes shall be determined based on functions and internal logic of the processes, but shall not be construed as any limitation on an implementation process of the embodiments of this disclosure.

It should be understood that determining A based on B does not mean that B is determined based on only A, that is, B may be determined based on A and/or other information.

It should be understood that the term "and/or" in this specification describes only an association relationship between associated objects, and represents that three relationships may exist. For example, A and/or B may represent the following three cases: only A exists, both A and B exist, and only B exists. In addition, the character "I" in this specification generally indicates an "or" relationship between associated objects.

It should be understood that "one embodiment" or "an embodiment" mentioned in the entire specification means that specific features, structures, or characteristics related to the embodiment are included in at least one embodiment of this disclosure. Therefore, "in one embodiment" or "in an embodiment" appearing in the entire specification does not necessarily refer to a same embodiment. In addition, these specific features, structures, or characteristics may be combined in any appropriate manner in one or more embodiments.

Terms in this disclosure are explained below.

Speech endpoint detection is a technology for detecting a speech end point in audio. Further, audio usually includes a plurality of audio signals. In an endpoint detection process, each audio signal may be sequentially detected, to determine whether a current audio signal is a speech end point.

The speech endpoint detection technology is usually applied to a speech interaction scenario. After a user speaks, speech endpoint detection is performed on audio to determine a speech start point and a speech end point, and audio between the speech start point and the speech end point is captured as a voice instruction. For the speech start point, speech interaction is usually proactively initiated by the user. For example, speech interaction may be triggered in a push to talk (PTT) manner. For example, the user may start speech interaction by pressing a physical key or a virtual key. For another example, speech interaction may be triggered in a voice wakeup (voice trigger (VT)) manner. For example, the user may start speech interaction by uttering a wakeup keyword. Therefore, accurate detection of the speech start point is easier to implement. The speech end point usually needs to be automatically detected by a machine.

In a related technology, a speech end point is usually implemented only by using ASR and VAD technologies.

VAD is used to detect whether an audio signal in a specific time window is a speech signal. A speech end point detection solution depending on the VAD technology is as follows. When non-speech that lasts for specific duration is detected through VAD, it is determined that speech ends. Generally, the duration is fixed duration, for example, 800 milliseconds. If non-speech that lasts for more than 800 milliseconds is detected through VAD, it is determined that speech ends, and a currently detected audio signal is used as a speech endpoint. Speech trailing silence (TS) is an important parameter of such an endpoint detection method. However, it is difficult to set a fixed duration parameter to adapt to all scenarios and environments. For example, if a specified duration parameter is excessively large, a delay perceived by a user is longer. If a specified duration parameter is excessively small, speech of a user is easily truncated.

Using the ASR technology and VAD technology for speech end point detection have two main problems. First, background noise easily causes delayed detection of a speech end point. Second, if speech includes a pause, premature detection of a speech end point is easily caused. The two problems greatly affect use experience of a user. Because of the first problem, a machine does not detect, until after a long time, that a voice instruction has ended. Because an actual end time of the voice instruction is longer than a detected end time, the voice instruction is executed after a period of time after the voice instruction ends. As a result, a delay of voice instruction execution is excessively long. From a perspective of the user, after speech is uttered, a system does not perform feedback until after a long time. This undoubtedly causes stalling, and affects user experience. Because of the second problem, the system truncates speech of the user before the speech ends. As a result, a voice instruction obtained by the system through parsing based on the prematurely truncated speech is incomplete. Consequently, a user intention identified by the system based on the voice instruction is greatly different from an actual user intention. This further causes a speech interaction service processing error. It can be learned that, in some scenarios, VAD depending on acoustic information independently is insufficient to accurately determine a speech endpoint status.

According to the following embodiments, determining can be performed comprehensively with reference to acoustic information, text information, and visual information, so as to implement multi-modal speech end point detection. A speech end point detected by using such a method is more accurate. Therefore, the two problems of an excessively long delay and premature truncation can be effectively resolved, thereby overcoming defects of the VAD solution, so that user experience can be greatly improved. In addition, the method may not depend on a specific ASR engine or a specific scenario, detection for each modality may be independently performed, and determining is performed comprehensively based on all modalities. This is more operable.

The following describes an example of a hardware environment in this disclosure.

FIG. 1 is a schematic diagram of an implementation environment of a speech detection method according to an embodiment of this disclosure. The implementation environment includes a terminal and a speech detection platform.

Referring to FIG. 1, the terminal may be a vehicle-mounted terminal 101, a smartphone 102, a smart speaker 103, or a robot 104. Certainly, the several terminals shown in FIG. 1 are merely examples. The terminal may alternatively be another electronic device supporting speech detection, such as a smart home device, a smart television (TV), a game host, a desktop computer, a tablet computer, an ebook reader, a smart TV, Moving Picture Experts Group (MPEG) audio layer III (MP3) player, an MPEG audio layer IV (MP4) player, or a laptop computer. A device type of the terminal is not limited in this embodiment.

The terminal may run an application program that supports speech detection. The application program may be a navigation application, a speech assistant, a smart Q&A application, or the like. For example, the terminal is a terminal used by a user. In an application program that is run on the terminal, a user account is logged in to. The user account may be pre-registered on the speech detection platform. The terminal may be connected to the speech detection platform through a wireless network or a wired network.

The speech detection platform is used to provide a background service for the application program that supports speech detection. For example, the speech detection platform may perform the following method embodiment to obtain a prediction model through training, and send the prediction model to the terminal, so that the terminal performs speech detection by using the prediction model.

The speech detection platform includes a server 201 and a database 202. The server 201 may be one server, or may be a cluster including a plurality of servers. The database 202 may be used to store a sample set, for example, a sample face image set including a large quantity of sample face images, and a sample audio signal set including a large quantity of sample audio signals. The server 201 may access the database 202 to obtain the sample set stored in the database 202, and obtain the prediction model through training by using the sample set.

A person skilled in the art may know that a quantity of the foregoing terminal, server, or database may be larger or smaller. For example, there may be only one terminal, server, or database. Alternatively, there may be dozens of, hundreds of, or more terminals, servers, or databases. In this case, although not shown in the figure, a speech detection system further includes another terminal, another server, or another database.

The foregoing describes an example of a system architecture. The following describes an example of a method procedure of performing speech detection based on the system architecture provided above.

A speech detection method procedure may include a model training phase and a model prediction phase. The following describes a method procedure in the model training phase by using an embodiment in FIG. 2, and describes a method procedure in the model prediction phase by using an embodiment in FIG. 6.

Figure 2:
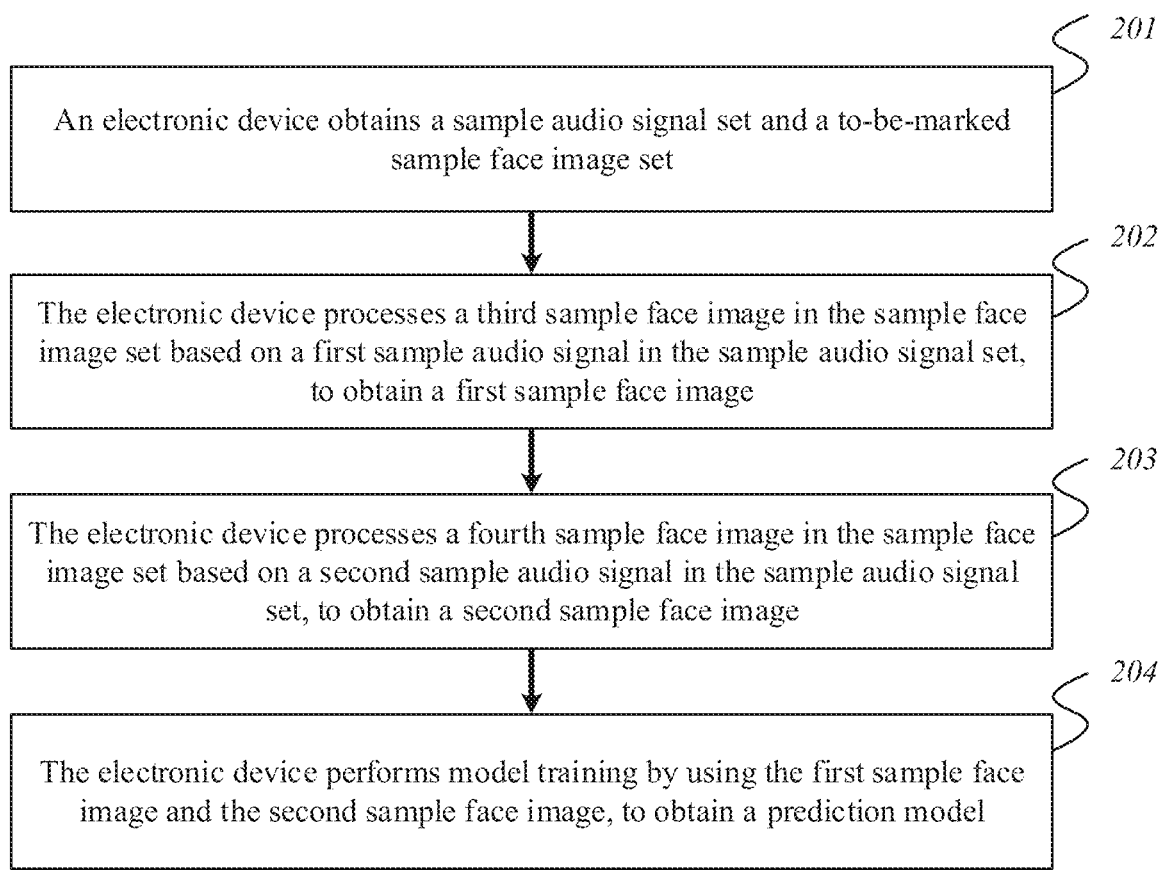
FIG. 2 is a flowchart of a method for training a prediction model used for speech detection according to an embodiment of this disclosure.

FIG. 2 is a flowchart of a method for training a prediction model used for speech detection according to an embodiment of this disclosure. As shown in FIG. 2, the method may be applied to an electronic device. The electronic device may be the terminal in the system architecture shown in FIG. 1, or may be the speech detection platform in the system architecture shown in FIG. 1, for example, the electronic device is the server 201. The method includes the following steps.

Step 201: The electronic device obtains a sample audio signal set and a to-be-marked sample face image set.

The sample audio signal set includes a plurality of sample audio signals. The sample face image set includes a plurality of sample face images. A photographing time point and a photographing object of each sample face image are the same as a collection time point and a collection object of a corresponding sample audio signal. A sample face image may be marked based on a correspondence between the sample face image and a sample audio signal.

Step 202: The electronic device processes a third sample face image in the sample face image set based on a first sample audio signal in the sample audio signal set, to obtain a first sample face image.

The electronic device may obtain the sample audio signal set. The sample audio signal set includes the plurality of sample audio signals, and there may be a correspondence between each sample audio signal and each sample face image. A correspondence between a sample audio signal and a sample face image means that a collection time point of the sample audio signal is the same as a photographing time point of the sample face image. For example, a sample face image photographed at a moment XY corresponds to a sample audio signal collected at the moment XY. The sample audio signal set may be obtained in a plurality of manners. For example, the electronic device may include a microphone. The electronic device may receive a sound recording instruction, and collect, in response to the sound recording instruction and by using the microphone, audio sent by a sample user, to obtain a sample audio signal. The sound recording instruction may be triggered by an operation of the user. For another example, the electronic device may request the sample audio signal set from a server by using a network. How to obtain the sample audio signal set is not limited in this embodiment.

The third sample face image is an unmarked sample face image. The third sample face image may be any sample face image in the sample face image set. There is a correspondence between the first sample audio signal and the third sample face image. A photographing time point and a photographing object of the third sample face image are the same as a collection time point and a collection object of the corresponding first sample audio signal.

The electronic device may obtain the sample face image set. The sample face image set includes a plurality of third sample face images. The sample face image set may be obtained in a plurality of manners. For example, the electronic device may include a camera. The electronic device may receive a photographing instruction, and photograph a sample user in response to the photographing instruction and by using the camera, to obtain the sample face image set. The photographing instruction is used to instruct the electronic device to perform photographing. The photographing instruction may be triggered by an operation of the user. For another example, the electronic device may read the sample face image set that is prestored. For another example, the electronic device may request the sample face image set from a server by using a network. How to obtain the sample face image set is not limited in this embodiment.

The first sample face image is a marked sample face image. The first sample face image may be obtained by adding a label to the third sample face image. Because the photographing time point and the photographing object of the third sample face image are the same as a photographing time point and a photographing object of the first sample face image, the photographing time point and the photographing object of the first sample face image are also the same as the collection time point and the collection object of the first sample audio signal. Content of the first sample face image is a face of a sample user. The first sample face image includes a feature that the sample user intends to continue speaking. The first sample face image may be obtained by photographing the sample user by using the camera. There may be a plurality of first sample face images, and different first sample face images may correspond to a same sample user or different sample users. The first sample face image is marked with a first label.

The first label indicates that the sample user intends to continue speaking. The first label may be in any data format, for example, a number, a letter, or a character string. For example, the first label may be "think before speaking" (a thinking state before speaking).

The first sample face image may be obtained in a plurality of manners. The following uses an obtaining manner 1 to an obtaining manner 3 as examples for description.

Obtaining manner 1: The electronic device obtains the sample face image set. For each third sample face image in the sample face image set, the electronic device may determine a first sample audio signal corresponding to the third sample face image, determine whether the first sample audio signal meets a first condition, and if the first sample audio signal meets the first condition, add the first label to the third sample face image to obtain a first sample face image. The first sample face image includes the third sample face image and the first label. It can be learned from the procedure that, in the obtaining manner 1, the first label is determined based on the first sample audio signal.

The first condition is used to determine whether the first sample audio signal contains an intention of continuing speaking. If the first sample audio signal meets the first condition, the corresponding third sample face image may be marked as the first sample face image. The first condition may be set based on an experiment, experience, or a requirement. For example, the first condition may include at least one of the following first conditions (1) to (4).

First condition (1): A VAD result corresponding to the first sample audio signal is first updated from a speaking state to a silent state, and then updated from the silent state to the speaking state.

A sample face image represents, in a visual dimension, a user intention of a sample user at a moment XY. A sample audio signal represents, in an acoustic dimension, the user intention of the sample user at the moment XY. Therefore, it can be learned that the sample face image and the sample audio signal reflect the same user intention from different modalities. Based on this idea, an association relationship between an acoustic-modal feature and a visual-modal feature of a user intention may be mined by using a sample face image and a sample audio signal that correspond to each other. In this way, in a model prediction phase, a speech end point may be detected based on the association relationship with reference to features of a plurality of modalities.

In some embodiments, a detection process for the first condition (1) may include the following. The electronic device may include a VAD unit, and the VAD unit is configured to detect whether an audio signal in a current time window is a speech signal. The VAD unit may be software, may be hardware, or may be a combination of software and hardware. An input parameter of the VAD unit may include an audio signal. An output parameter of the VAD unit may include a VAD result of the audio signal. The VAD result may include the speaking state and the silent state. The speaking state indicates that the audio signal is a speech signal. For example, the speaking state may be recorded as speech in a program. The silent state indicates that the audio signal is not a speech signal, and the silent state may be recorded as silence in the program. In a process of marking a sample face image, the first sample audio signal may be input into the VAD unit, and the VAD unit performs VAD processing on the first sample audio signal, and outputs a VAD result. If the VAD result is first the speaking state, then changes to the silent state, and then changes back to the speaking state, it may be determined that the first sample audio signal meets the first condition (1).

An effect of setting the first condition (1) is described below with reference to an example scenario.

If a sample user pauses for a short time during speech, in this scenario, in a process of performing VAD on audio collected during the speech, for before-pause audio, a VAD result is the speaking state, for during-pause audio, the VAD result is the silent state, for after-pause audio, the VAD result changes back to the speaking state. If a collected sample audio signal meets the first condition (1), it indicates that the sample audio signal is consistent with the during-pause audio in this scene. After the pause, the sample user continues speaking instead of ending the speech. Therefore, at a pause time point, the sample user intends to continue speaking. In this case, a sample face image photographed at the pause time point contains the user intention of continuing speaking. The sample face image is marked as a first face image, so that the model can subsequently learn, by using the first sample face image, a mapping relationship between a face image and the user intention of continuing speaking. In this way, in a model application phase, whether a current user intends to continue speaking can be predicted based on an unknown face image by using the model.

First condition (2): Trailing silence duration of the first sample audio signal is less than a first threshold and greater than a second threshold.

Trailing silence duration is also referred to as a speech trailing silence (TS), and is total duration of a trailing silence segment of a speech signal. Longer trailing silence duration of an audio signal indicates a higher probability that the audio signal is a speech end point. In this embodiment, a threshold may be used to detect whether trailing silence duration of an audio signal meets the first condition of speech ending. Further, thresholds corresponding to trailing silence duration may include the first threshold and the second threshold.

The first threshold may be a maximum value in the thresholds corresponding to trailing silence duration, and the first threshold is greater than the second threshold. If the trailing silence duration is greater than the first threshold, it may be determined that the audio signal is the speech end point. For example, the first threshold may be denoted by $D_{max}$ in the program. A specific value of the first threshold may be configured based on an experiment, experience, or a requirement. The specific value of the first threshold is not limited in this embodiment.

The second threshold may be a minimum value in the thresholds corresponding to trailing silence duration. If the trailing silence duration is greater than the second threshold, it may be determined that the audio signal has a probability of being the speech end point, that is, the audio signal may be the speech end point or may not be the speech end point. A feature of another modality may be used to further determine whether the audio signal is the speech end point. For example, the second threshold may be denoted by $D_{min}$ in the program.

Further, the electronic device may detect the trailing silence duration of the first sample audio signal, and compare the trailing silence duration with the first threshold and the second threshold. If the trailing silence duration is less than the first threshold and greater than the second threshold, the electronic device may determine that the first sample audio signal meets the first condition (2).

First condition (3): A first confidence degree corresponding to a text information combination is greater than a second confidence degree corresponding to first text information.

The text information combination is a combination of the first text information and second text information. The first text information indicates semantics of a previous sample audio signal of the first sample audio signal. The second text information indicates semantics of a next sample audio signal of the first sample audio signal. The text information combination may be an ordered combination, where the first text information comes before the second text information.

For example, if a sample user pauses for a short time during speech, the text information combination may indicate semantics of entire audio during the speech, the first text information may indicate semantics of before-pause audio, and the second text information may indicate semantics of after-pause audio. In an example scenario, the user says "I am going to Golden Sea Road", then pauses for a moment, and then continues to say "Golden Ear Road". In this scenario, the first sample audio signal may be a silence segment during the pause, the first text information is text information corresponding to a before-pause audio signal, that is, "I am going to Golden Sea Road", the second text information is text information corresponding to an after-pause audio signal, that is, "Golden Ear Road", and the text information combination may be a combination of "I am going to Golden Sea Road" and "Golden Ear Road", that is, "I am going to Golden Sea Road Golden Ear Road".

The first confidence degree indicates a probability that the text information combination is a complete statement. A larger first confidence degree indicates a higher probability that the text information combination is a complete statement, a higher probability that the first sample audio signal is a pause instead of an end, a higher probability that the third sample face image corresponding to the first sample audio signal contains the intention of continuing speaking, and higher accuracy of marking the third sample face image as the first sample face image. For example, in the foregoing scenario, the first confidence degree may indicate a probability that "I am going to Golden Sea Road Golden Ear Road" is a complete statement. The first confidence degree may be denoted by $Conf_{merge}$.

The second confidence degree indicates a probability that the first text information is a complete statement. A larger second confidence degree indicates a higher probability that the first text information is a complete statement, a higher probability that the first sample audio signal is an end instead of a pause, and a higher probability that the third sample face image corresponding to the first sample audio signal contains an intention of not continuing speaking. For example, in the foregoing scenario, the second confidence degree may indicate a probability that "I am going to Golden Sea Road" is a complete statement. The second confidence degree may be denoted by $Conf_{spliti}$.

Further, a process of performing detection by the electronic device based on the first condition (3) may include the following steps.

Step 1: Perform speech recognition on the previous sample audio signal of the first sample audio signal, to obtain the first text information.

Step 2: Perform speech recognition on the next sample audio signal of the first sample audio signal, to obtain the second text information.

Step 3: Splice the first text information and the second text information to obtain the text information combination.

Step 4: Perform syntax analysis on the text information combination to obtain the first confidence.

Step 5: Perform syntax analysis on the first text information to obtain the second confidence.

Step 6: Compare the first confidence degree with the second confidence, and if the first confidence degree is greater than the second confidence, it may be determined that the sample face image meets the first condition (3).

First condition (4): The first confidence degree corresponding to the text information combination is greater than a third confidence degree corresponding to the second text information.

The third confidence degree indicates a probability that the second text information is a complete statement. A larger third confidence degree indicates a higher probability that the second text information is a complete statement. For example, in the foregoing scenario, the third confidence degree may indicate a probability that "Golden Ear Road" is a complete statement.

Further, a process of performing detection by the electronic device based on the first condition (4) may include the following steps.

Step 1: Perform speech recognition on the previous sample audio signal of the first sample audio signal, to obtain the first text information.

Step 2: Perform speech recognition on the next sample audio signal of the first sample audio signal, to obtain the second text information.

Step 3: Splice the first text information and the second text information to obtain the text information combination.

Step 4: Perform syntax analysis on the text information combination to obtain the first confidence.

Step 5: Perform syntax analysis on the second text information to obtain the third confidence.

Step 6: Compare the first confidence degree with the third confidence, and if the first confidence degree is greater than the third confidence, it may be determined that the sample face image meets the first condition (4).

It should be noted that the first condition (3) and the first condition (4) may be combined. There may be an "and" relationship between the first condition (3) and the first condition (4) in such a combination solution. Further, the combination solution of the first condition (3) and the first condition (4) may be as follows.

Step 1: Perform speech recognition on the previous sample audio signal of the first sample audio signal, to obtain the first text information.

Step 2: Perform speech recognition on the next sample audio signal of the first sample audio signal, to obtain the second text information.

Step 3: Splice the first text information and the second text information to obtain the text information combination.

Step 4: Perform syntax analysis on the text information combination to obtain the first confidence.

Step 5: Perform syntax analysis on the first text information to obtain the second confidence.

Step 6: Perform syntax analysis on the second text information to obtain the third confidence.

Step 7: Compare the first confidence degree with the second confidence, and compare the first confidence degree with the third confidence, and if the first confidence degree is greater than the second confidence, and the first confidence degree is greater than the third confidence, it may be determined that the sample face image meets the first condition, or if the first confidence degree is less than or equal to the second confidence, or the first confidence degree is less than or equal to the third confidence, it may be determined that the sample face image does not meet the first condition.

An effect achieved by using the first condition (3) and the first condition (4) may include at least the following. For a sentence that includes a short pause, in a related technology, the complete sentence is split into two segments of speech by using a pause point as a separation point. For example, for "I am going to Golden Sea Road Golden Ear Road", if the user pauses after saying "I am going to Golden Sea Road", the electronic device divides the sentence into "I am going to Golden Sea Road" and "Golden Ear Road". When the user says "Road" in "I am going to Golden Sea Road", the electronic device prematurely determines that a speech end point is already detected. This results in premature detection of a speech end point. In this case, the electronic device directly uses "I am going to Golden Sea Road" as a voice instruction, and ignores the subsequent "Golden Ear Road". As a result, the recognized voice instruction is incomplete. If the electronic device directly performs service processing based on "I am going to Golden Sea Road", for example, navigates to Golden Sea Road, accuracy of service processing is undoubtedly affected.

By contrast, according to the foregoing method, two segments of audio signals can be comprehensively considered. To be specific, recognition is not only performed on each of the two segments of audio signals to obtain a confidence degree that each of sentence segments corresponding to the two segments of audio signals is a complete statement, but also performed on an entirety including the plurality of segments of audio signals, to obtain a confidence degree that the entirety including the two sentence segments is a complete statement. If the confidence degree that the entirety is a complete statement is greater than the confidence degree that each of the two sentence segments is a complete statement, a sample face image corresponding to a silence segment between the two sentence segments is extracted and marked as the first sample face image, so that the model can use the marked first sample face image to learn a feature that a face image includes during a pause. For example, if the confidence degree of "I am going to Golden Sea Road Golden Ear Road" is greater than the confidence degree of "I am going to Golden Sea Road" and the confidence degree of "Golden Ear Road", a sample face image corresponding to a silence segment between "I am going to Golden Sea Road" and "Golden Ear Road" is extracted, and the label "think before speaking" is added to the sample face image.

It should be understood that the first condition (1) to the first condition (4) may be combined in any manner. For example, only one of the four first conditions may be used, or two or more of the four first conditions may be used for execution. If different first conditions are combined, a logical relationship between the different first conditions may be an "and" relationship, or may be an "or" relationship. For example, referring to FIG. 3, a case in which the first condition is met may be shown in FIG. 3. It should be further understood that, if different first conditions in the first condition (1) to the first condition (4) are combined, a chronological order of determining based on the different first conditions in such a combination solution is not limited. One implementation may be performed before another implementation, or a plurality of implementations may be performed in parallel.

In addition, in a process of marking, for each third sample face image in the sample face image set, the electronic device may further determine whether the third sample face image meets a third condition, and if the third sample face image meets the third condition, add the first label to the third sample face image to obtain a first sample face image. The third condition may be combined with any one or more of the first condition (1) to the first condition (4). If the third condition is combined with any one or more of the first condition (1) to the first condition (4), a logical relationship between the third condition and the first condition may be an "and" relationship, or may be an "or" relationship.

In some embodiments, the third condition includes that after the first sample face image is separately input into a first classifier in the prediction model and a second classifier in the prediction model, a probability output by the first classifier is greater than a probability output by the second classifier.

The first classifier is configured to predict a probability that a face image includes an action. An output parameter of the first classifier may be a probability that a face image includes an action, and an input parameter of the first classifier may be a key-point feature of the face image. The first classifier may be referred to as an action unit. The first classifier may be a part of the prediction model. For example, the first classifier may be a part of an action recognition layer in FIG. 5, and may include one or more action units (AUs).

The second classifier is configured to predict a probability that a face image does not include an action. An output parameter of the second classifier may be a probability that a face image does not include an action, and an input parameter of the second classifier may be a key-point feature of the face image. The second classifier may be referred to as an action unit.

The first classifier and the second classifier may be used in combination. For example, if the probability output by the first classifier is greater than the probability output by the second classifier, it indicates that an output result of the first classifier is valid. In some embodiments, there may be a plurality of first classifiers, and each first classifier may be configured to predict one action, or a combination of a plurality of first classifiers may be configured to predict one action. A sum of the probability output by the second classifier and probabilities output by the plurality of first classifiers may be equal to 1.

For example, there may be N first classifiers, and N is a positive integer. An $i^{th}$ first classifier in the N first classifiers may be denoted by $AU_i$, and a probability output by the $AU_i$ may be denoted by $PAU_i$. The second classifier may be denoted by NEU, and a probability output by the NEU may be denoted by PNEU. A sum of $PAU_1$, $PAU_2$, ..., $PAU_N$, and PNEU is 1. If an output result of the first classifier $AU_i$ is greater than an output result of the second classifier NEU, that is, $PAU_i$ is greater than $P_{NEU}$, the current output result of the first classifier $AU_i$ is valid. If an output result of the first classifier $AU_i$ is less than or equal to an output result of the second classifier NEU, that is, $PAU_i$ is less than or equal to PNEU, the current output result of the first classifier $AU_i$ is invalid. N is a positive integer, i is a positive integer, and i is less than N. If there are a plurality of first classifiers, a first condition (5) may be as follows. A probability output by any one of the first classifiers is greater than the probability output by the second classifier, that is, $PAU_i > P_{NEU}$.

Obtaining manner 2: The electronic device sends an obtaining request to a database, where the obtaining request is used to request to obtain the first sample face image, and in response to the obtaining request, the database reads the first sample face image, and returns the first sample face image to the electronic device.

Obtaining manner 3: The electronic device accesses a local disk, and reads the first sample face image prestored in the disk.

It should be understood that the obtaining manner 1 to the obtaining manner 3 are merely examples for description, and do not represent a mandatory implementation of a function of obtaining the first sample face image. In some other embodiments, other implementations may be alternatively used to implement the function of obtaining the first sample face image. As a specific case of step 202, these other implementations for implementing the function of obtaining the first sample face image shall also fall within the protection scope of the embodiments of this disclosure.

Step 203: The electronic device processes a fourth sample face image in the sample face image set based on a second sample audio signal in the sample audio signal set, to obtain a second sample face image.

The fourth sample face image is an unmarked sample face image. The fourth sample face image may be any sample face image in the sample face image set. There is a correspondence between the second sample audio signal and the fourth sample face image. A photographing time point and a photographing object of the fourth sample face image are the same as a collection time point and a collection object of the corresponding second sample audio signal.

The second sample face image is a marked sample face image. The second sample face image may be obtained by adding a label to the third sample face image. Because the photographing time point and the photographing object of the fourth sample face image are the same as a photographing time point and a photographing object of the second sample face image, the photographing time point and the photographing object of the second sample face image are also the same as the collection time point and the collection object of the second sample audio signal. Content of the second sample face image is a face of a sample user. The second sample face image includes a feature that the sample user intends to continue speaking. The second sample face image may be obtained by photographing the sample user by using the camera. There may be a plurality of second sample face images, and different second sample face images may correspond to a same sample user or different sample users. In addition, the sample user corresponding to the second sample face image may be the same as or be different from the sample user corresponding to the first sample face image. The second sample face image is marked with a second label.

The second label indicates that the sample user does not intend to continue speaking. The second label may be in any data format, for example, a number, a letter, or a character string. For example, the second label may be "neutral".

The second sample face image may be obtained in a plurality of manners. The following uses an obtaining manner 1 to an obtaining manner 3 as examples for description.

Obtaining manner 1: The electronic device obtains the sample face image set. For each fourth sample face image in the sample face image set, the electronic device may determine a second sample audio signal corresponding to the fourth sample face image, determine whether the second sample audio signal meets a second condition, and if the second sample audio signal meets the second condition, add the second label to the fourth sample face image to obtain a second sample face image. The second sample face image includes the fourth sample face image and the second label. It can be learned from the procedure that, in the obtaining manner 1, the second label is determined based on the second sample audio signal.

The second condition is used to determine whether the corresponding second sample audio signal contains the intention of not continuing speaking. If the second sample audio signal meets the second condition, the corresponding fourth sample face image may be marked as the second sample face image. The second condition may be set based on an experiment, experience, or a requirement. For example, the second condition includes at least one of the following second conditions (1) and (2).

Second condition (1): A VAD result corresponding to the second sample audio signal is updated from the speaking state to the silent state.

Second condition (2): Trailing silence duration of the second sample audio signal is greater than the first threshold.

Further, the electronic device may detect the trailing silence duration of the second sample audio signal, and compare the trailing silence duration with the first threshold. If the trailing silence duration is greater than the first threshold, because the trailing silence duration is already greater than a maximum threshold, it indicates that the second sample audio signal is an end instead of a pause. In this case, the electronic device may determine that the second sample audio signal meets the second condition (2).

For example, referring to FIG. 4, if a sample audio signal meets a second condition shown in FIG. 4, the label "neutral" may be added to a sample face image, to indicate that the sample face image corresponds to a case that there is no user intention of continuing speaking.

An effect achieved by adding a corresponding label to a sample face image based on the first condition and the second condition may include at least the following. Multimodal information such as a photographed face image, a collected audio signal, and semantics of text information can be incorporated, so as to automatically mark training data with reference to global information. Because information of all modalities is comprehensively considered, this can ensure that a label of a sample face image matches a user intention of whether to continue speaking. In this way, a marked sample has high accuracy, so that user intention prediction accuracy is also comparatively high after the model is trained based on the accurate sample. Therefore, this helps to accurately detect a speech end point in the model application phase.

Obtaining manner 2: The electronic device sends an obtaining request to the database, where the obtaining request is used to request to obtain the second sample face image, and in response to the obtaining request, the database reads the second sample face image, and returns the second sample face image to the electronic device.

Obtaining manner 3: The electronic device accesses a local disk, and reads the second sample face image prestored in the disk.

It should be understood that the obtaining manner 1 to the obtaining manner 3 are merely examples for description, and do not represent a mandatory implementation of a function of obtaining the second sample face image. In some other embodiments, other implementations may be alternatively used to implement the function of obtaining the second sample face image. As a specific case of step 203, these other implementations for implementing the function of obtaining the second sample face image shall also fall within the protection scope of the embodiments of this disclosure.

It should be understood that a time sequence of step 202 and step 203 is not limited in this embodiment. In some embodiments, step 202 and step 203 may be sequentially performed. For example, step 202 may be performed before step 203. Alternatively, step 203 may be performed before step 202. In some other embodiments, step 202 and step 203 may be alternatively performed in parallel, that is, step 202 and step 203 may be simultaneously performed.

Step 204: The electronic device performs model training by using the first sample face image and the second sample face image, to obtain the prediction model.

The prediction model is used to predict whether a user intends to continue speaking. The prediction model may be a binary classifier, and a prediction result of the prediction model may include a first value and a second value. The first value of the prediction result indicates that the user intends to continue speaking. The second value of the prediction result indicates that the user does not intend to continue speaking. The first value and the second value may be any two different pieces of data. For example, the first value of the prediction result may be 1, and the second value of the prediction result may be 0. Alternatively, the first value of the prediction result may be 0, and the second value of the prediction result may be 1. For example, after a face image is input into the prediction model, if the prediction model predicts that the face image indicates that the user intends to continue speaking, the prediction model may output 1, if the prediction model predicts, based on the input face image, that the face image indicates that the user does not intend to continue speaking, the prediction model may output 0.

The prediction model may be an artificial intelligence (AI) model. There may be a plurality of specific types of prediction models. For example, the prediction model may include at least one of a neural network, a support vector machine, a linear regression model, a logistic regression model, a decision tree, or a random forest. For example, the prediction model may be a neural network. Further, the prediction model may be a convolutional neural network, a recurrent neural network, or the like.

When the prediction model is implemented by using the neural network, each module in the prediction model may be a layer, or each module may be a network including a plurality of layers. Each layer may include one or more nodes. For example, referring to FIG. 5, the prediction model includes an input layer, a first hidden layer, an action recognition layer, a second hidden layer, and an output layer. In addition, the prediction model may include a key-point extraction module (not shown in FIG. 5).

Figure 5:
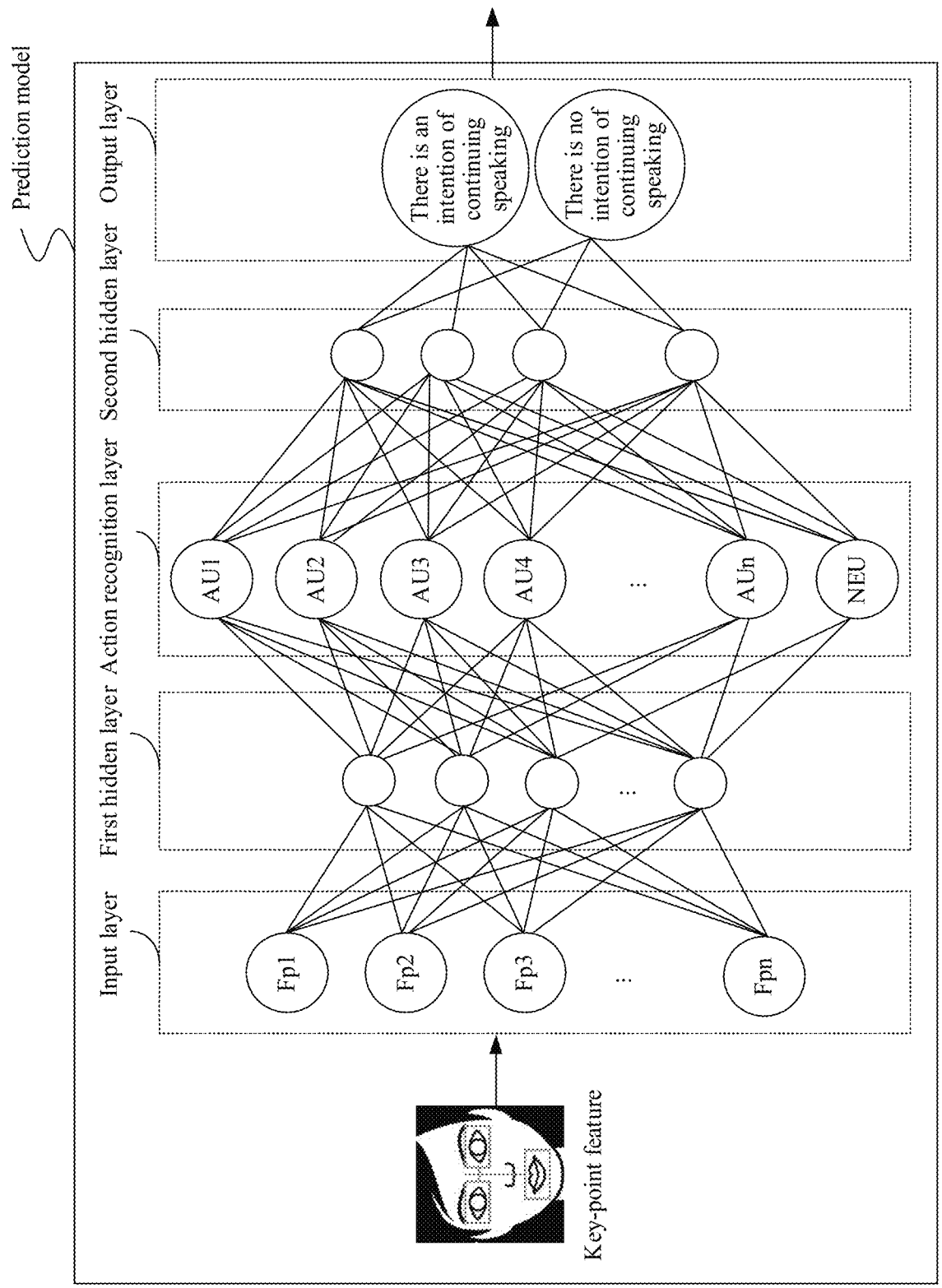
FIG. 5 is a schematic structural diagram of a prediction model according to an embodiment of this disclosure.

Different modules in the prediction model may be connected. The connection herein means that data interaction can be performed. As shown in FIG. 5, the input layer may be connected to the first hidden layer, the first hidden layer is connected to the action recognition layer, the action recognition layer is connected to the second hidden layer, and the second hidden layer is connected to the output layer. In addition, the key-point extraction module may be connected to the input layer. It should be understood that, although not shown in FIG. 5, there may be another connection relationship between different modules in the prediction model. For example, different layers may be connected in a cross-layer manner.

The key-point extraction module is configured to extract a key-point feature from a face image, and input the key-point feature to the input layer. The input layer is used to output the key-point feature to the first hidden layer. The first hidden layer is used to perform linear mapping and non-linear mapping on the key-point feature to obtain a mapped key-point feature, and output the mapped key-point feature to the action recognition layer. The action recognition layer is used to perform recognition on the mapped key-point feature to obtain action features, and output the action features to the second hidden layer. The second hidden layer is used to perform linear mapping and non-linear mapping on the action features to obtain mapped action features, and output the mapped action features to the output layer. The output layer is used to classify mapped action features, to obtain confidence degrees that respectively correspond to different types. The prediction result is determined based on the confidence degrees.

In some embodiments, the input layer may include a plurality of nodes, and each node of the input layer is used to receive a feature of one key point. For example, referring to FIG. 5, the input layer may include FP1, FP2, FP3, . . . , and FPn. The FP1 is used to receive a feature of a key point 1 and send the feature to the hidden layer. The FP2 is used to receive a feature of a key point 2 and send the feature to the hidden layer. The FP3 is used to receive a feature of a key point 3 and send the feature to the hidden layer. The rest may be deduced by analogy. The FPn is used to receive a feature of a key point n and send the feature to the hidden layer.

In some embodiments, the action recognition layer may include a plurality of first classifiers and a second classifier. Each first classifier may receive the mapped key-point feature from the first hidden layer, and perform action recognition to obtain a probability that the face image includes an action. The second classifier may receive the mapped key-point feature from the first hidden layer, and perform action recognition to obtain a probability that the face image does not include an action. If an output result of the first classifier is greater than an output result of the second classifier, the output result of the first classifier may be sent to the second hidden layer.

For example, referring to FIG. 5, the action recognition layer may include N first classifiers. Each of the N first classifiers may be referred to as an AU. The N first classifiers are respectively denoted by AU1, AU2, AU3, . . . , and AUn. A change in key muscle points of a face can be identified by using the N action units, so that a facial micro-expression and a mental state of a user can be identified based on the change in the muscle points. After non-linear transformation is performed on an identified feature by the hidden layer, whether the user intends to continue speaking in the future can be predicted.

A model training process may include a plurality of implementations. In some embodiments, model training may include a plurality of iteration processes. Each iteration process may include the following steps (1.1) to (1.3).

Step (1.1): The electronic device inputs a first sample image into the prediction model, processes the first sample image by using the prediction model, and outputs a prediction result.

Step (1.2): The electronic device calculates a first loss value based on the prediction result and the first label by using a loss function, where the first loss value indicates a deviation between the prediction result and the first label, and a larger deviation between the prediction result and the first label indicates a larger first loss value.

Step (1.3): The electronic device adjusts a parameter of the prediction model based on the first loss value.

Alternatively, each iteration process includes the following steps (2.1) to (2.3).

Step (2.1): The electronic device inputs a second sample image into the prediction model, processes the second sample image by using the prediction model, and outputs a prediction result.

Step (2.2): The electronic device calculates a second loss value based on the prediction result and the second label by using a loss function, where the second loss value indicates a deviation between the prediction result and the second label, and a larger deviation between the prediction result and the second label indicates a larger second loss value.

Step (2.3): The electronic device adjusts a parameter of the prediction model based on the second loss value.

The foregoing shows an iteration process of training. After each iteration, the electronic device may detect whether a training termination condition is met currently. When the training termination condition is not met, the electronic device executes a next iteration process. When the training termination condition is met, the electronic device outputs, as a trained prediction model, a prediction model used in a current iteration process.

The training termination condition may be that a quantity of iterations reaches a target quantity or a loss function meets a preset condition, or may be that a capability is not improved in a period of time during verification performed based on a verification dataset. The target quantity may be a preset quantity of iterations, and is used to determine a training end occasion, to avoid a waste of training resources. The preset condition may be that, in a period of time in a training process, a loss function value remains unchanged or does not decrease. In this case, it indicates that the training process already achieves a training effect, that is, the prediction model has a function of identifying, based on a face image, whether the user intends to continue speaking.

In some embodiments, a prediction model training process may include a first training phase and a second training phase. The first training phase is used to train the first classifier and the second classifier. The second training phase is used to train a third classifier. Each of the first classifier, the second classifier, and the third classifier may be a part of the prediction model. For example, the first classifier may be a part of the action recognition layer in FIG. 5, and may include one or more AUs. The second classifier may also be a part of the action recognition layer in FIG. 5, and may include one or more AUs. The third classifier may be a determiner at the output layer in FIG. 5. Model training may be performed in advance by using a fifth sample face image and a sixth sample face image, to obtain the first classifier and the second classifier. A sample face image is marked based on the third condition by using the first classifier and the second classifier. The first classifier, the second classifier, and the to-be-trained third classifier are combined to obtain a to-be-trained prediction model. The to-be-trained prediction model includes the first classifier and the untrained third classifier. Then, according to this embodiment, training is performed by using the marked first sample face image and second sample face image, so that a model parameter of the third classifier is adjusted, and a capability of determining whether there is an intention of speaking can be learned, so as to finally obtain the prediction model.

This embodiment provides a model training method for implementing a user intention prediction function. Model training is performed by using the sample face image that contains the user intention of continuing speaking and the sample face image that contains a user intention of not continuing speaking. Through a training process, the prediction model can learn, from the sample face image that contains the user intention of continuing speaking and the corresponding label, what a face image feature is like when the user intends to continue speaking, and learn, from the sample face image that contains the user intention of not continuing speaking and the corresponding label, what a face image feature is like when the user does not intend to continue speaking. Because the prediction model learns a correspondence between a user intention and a face image feature, in the model application phase, whether a current user intends to continue speaking can be predicted based on an unknown face image by using the model, so that whether a current speech signal is a speech end point is accurately detected based on a user intention indicated by the face image.

The foregoing method embodiment describes a prediction model training procedure. The following describes, by using an embodiment in FIG. 6, a procedure of performing speech endpoint detection by using the prediction model provided in the embodiment in FIG. 2.

Figure 6:
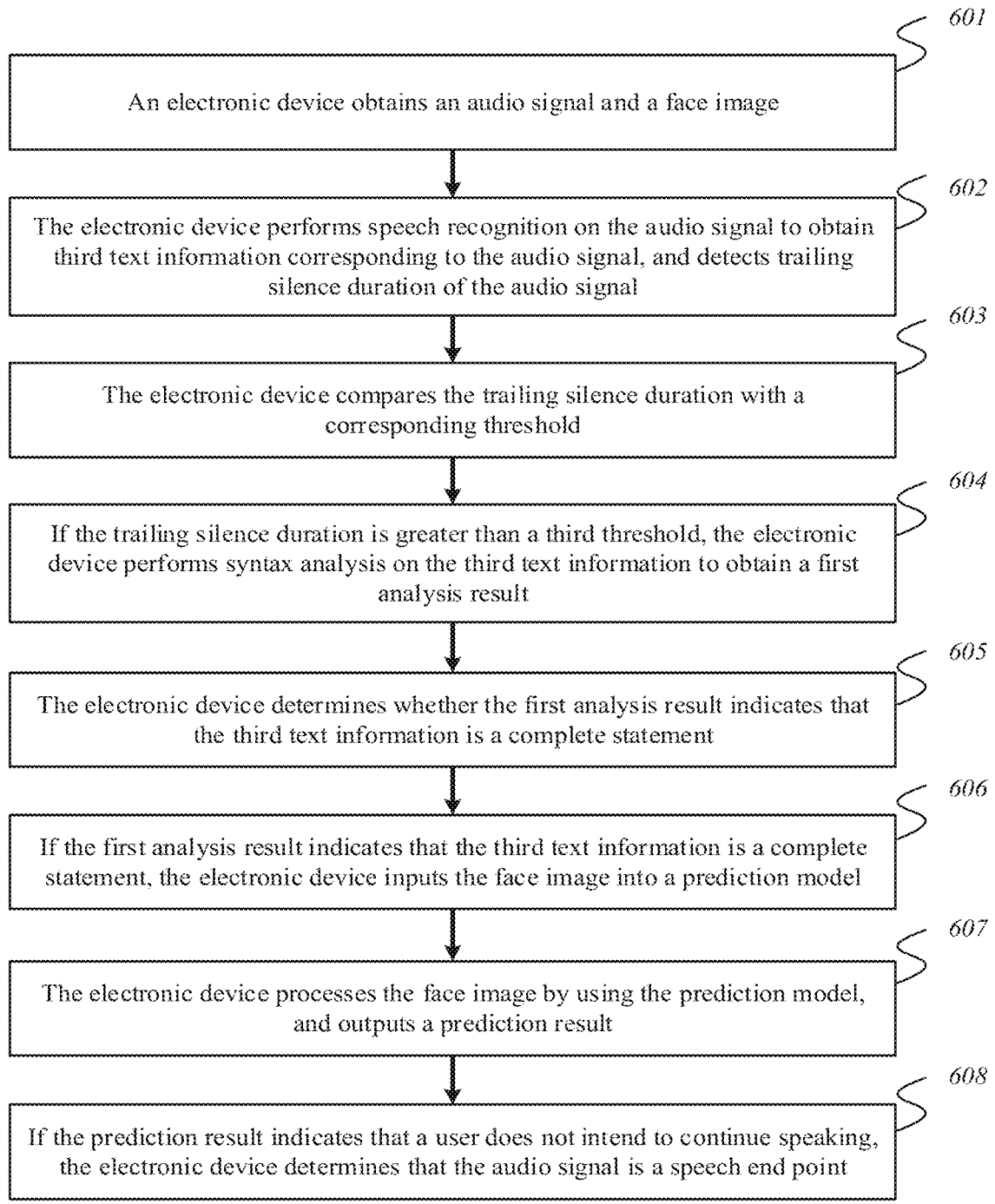
FIG. 6 is a flowchart of a speech detection method according to an embodiment of this disclosure.

FIG. 6 is a flowchart of a speech detection method according to an embodiment of this disclosure. The method is applied to an electronic device. The electronic device may be the terminal in the system architecture shown in FIG. 1, or may be the speech detection platform in the system architecture shown in FIG. 1, for example, the electronic device is the server 201. The electronic device performing the embodiment in FIG. 6 and the electronic device performing the embodiment in FIG. 2 may be the same electronic device, or may be different electronic devices. If the electronic device performing the embodiment in FIG. 6 is different from the electronic device performing the embodiment in FIG. 2, the electronic devices in the two method embodiments may interact to cooperatively complete a speech detection task. For example, a prediction model training step may be performed by a server, and a step of performing detection by using the prediction model may be performed by a terminal. Certainly, alternatively, a prediction model training step and a detection step may be both performed on a terminal side, or both performed on a server side. Further, the method includes the following steps.

Step 601: The electronic device obtains an audio signal and a face image.

A photographing time point of the face image is the same as a collection time point of the audio signal. The audio signal and the face image that correspond to the same time point are obtained, so that a user intention indicated by the face image is the same as a user intention indicated by the audio signal. Therefore, whether the audio signal is a speech end point can be accurately detected based on information included in the face image.

For example, at a moment XY, the electronic device may collect an audio signal by using a camera, and photograph a face image by using the camera. The audio signal may indicate whether a user intends, at the moment XY, to continue speaking. The face image may also indicate whether the user intends, at the moment XY, to continue speaking.

Certainly, that the electronic device itself collects the audio signal and photographs the face image is merely an example for description. In some other embodiments, the electronic device may alternatively receive a speech detection instruction from a terminal, where the speech detection instruction carries the audio signal and the face image, the electronic device may perform, in response to the speech detection instruction, the following method procedure based on the audio signal and the face image, and return a speech detection result to the terminal.

A trigger condition of step 601 may include a plurality of cases. For example, this embodiment may be applied to a speech interaction scenario. If the terminal detects an audio signal including a wakeup keyword, the terminal may switch from a standby state to a working state, that is, the terminal is woken up. A wakeup event of the terminal may trigger execution of step 601.

Step 602: The electronic device performs speech recognition on the audio signal to obtain third text information corresponding to the audio signal, and detects trailing silence duration of the audio signal.

To distinguish from descriptions of the text information used in the model training phase, in this embodiment, text information corresponding to the audio signal obtained in step 601 is referred to as the third text information. Further, ASR may be performed on the audio signal obtained in step 601, to obtain the third text information. For example, the third text information may be "make a phone call to Teacher Zhang" or "navigate to Century Avenue". In addition, VAD may be further performed on the audio signal obtained in step 601, to obtain the trailing silence duration.

It should be understood that a time sequence of a speech recognition step and a trailing silence duration detection step is not limited in this embodiment. In some embodiments, in a process of performing step 602, the speech recognition step and the trailing silence duration detection step may be sequentially performed. For example, the speech recognition step may be performed before the trailing silence duration detection step, or the trailing silence duration detection step may be performed before the speech recognition step. In some other embodiments, the speech recognition step and the trailing silence duration detection step may be alternatively performed in parallel, that is, the speech recognition step and the trailing silence duration detection step may be simultaneously performed.

Step 603: The electronic device compares the trailing silence duration with a corresponding threshold.

In a process of comparing the trailing silence duration with the threshold, a third threshold may be used. The third threshold may be the first threshold mentioned in the embodiment in FIG. 2, may be the second threshold mentioned in the embodiment in FIG. 2, may be a combination of the first threshold and the second threshold, or may be a threshold other than the first threshold and the second threshold. In some embodiments, the process of comparing with the threshold may include the following steps.

Step (1): The electronic device may compare the trailing silence duration with the first threshold, and perform step (2) if the trailing silence duration is less than the first threshold. In addition, if the trailing silence duration is greater than or equal to the first threshold, the electronic device determines that a speech signal is the speech end point.

Step (2): The electronic device may compare the trailing silence duration with the third threshold, and perform step 604 if the trailing silence duration is greater than the third threshold. If the trailing silence duration is less than or equal to the third threshold, the electronic device continues to obtain a next audio signal and a face image corresponding to the next audio signal, and continues to perform step 601 to step 603 on the next audio signal. The third threshold used in step (2) may be less than the first threshold used in step (1). In addition, a value of the third threshold used in step (2) is equal to a value of the foregoing second threshold, that is, a silence detection threshold used on an inference side may be the same as a silence detection threshold used on a training side.

In the foregoing comparison manner, when the trailing silence duration is between the third threshold and the first threshold, the following speech detection procedure may be performed. An effect achieved in this manner may include at least the following. Once the silence duration is greater than a minimum threshold (the third threshold), speech end point detection is performed by using a syntax analysis result and a face analysis result with reference to a text modality and an image modality, so that the speech endpoint is detected as quickly and accurately as possible by using a combination of multi-modal information. This avoids a case of an excessively long delay. When the silence duration is greater than a maximum threshold (the first threshold), because the silence duration is excessively long, a syntax analysis procedure and a face analysis procedure may be skipped to directly determine that the speech end point is already detected.

Step 604: If the trailing silence duration is greater than the third threshold, the electronic device performs syntax analysis on the third text information to obtain a first analysis result.

The first analysis result is used to indicate whether the third text information is a complete statement. The first analysis result may include a first value and a second value. The first value of the first analysis result indicates that the third text information is a complete statement. The second value of the first analysis result indicates that the third text information is a to-be-supplemented statement rather than a complete statement. The first value and the second value of the first analysis result may be any two different pieces of data. For example, the first value of the first analysis result is 1, and the second value of the first analysis result is 0. Alternatively, the first value of the first analysis result is 0, and the second value of the first analysis result is 1. The third text information may be considered as a word sequence, and the first analysis result may be a sequence prediction result of the word sequence.

Syntax analysis may be implemented in a plurality of manners. In some embodiments, syntax analysis includes the following steps 1 to 5.

Step 1: The electronic device performs word segmentation on the third text information to obtain a plurality of words.

There may be a plurality of word segmentation manners. For example, segmentation may be performed at intervals of one character, so that each obtained word is one character. For example, referring to FIG. 7, the third text information is "make a phone call to Teacher Zhang", and a plurality of words obtained by performing word segmentation on "make a phone call to Teacher Zhang" are "make", "a", "phone", "call", "to", "Teacher", and "Zhang". For another example, referring to FIG. 8, the third text information is "perform navigation to Golden Sea Road Golden Ear Road", and a plurality of words obtained by performing word segmentation on "perform navigation to Golden Sea Road Golden Ear Road" are "perform", "navigation", "to", "Golden", "Sea", "Road", "Golden", "Ear", and "Road".

Step 2: For each of the plurality of words, the electronic device performs syntax analysis on the word, to obtain a second analysis result corresponding to the word.

The second analysis result is used to indicate whether the word and a word before the word form a complete statement. For example, the second analysis result may include a first value and a second value. The first value of the second analysis result indicates that the word and the word before the word form a complete statement. The second value of the second analysis result indicates that the word and the word before the word do not form a complete statement. The first value and the second value of the second analysis result may be any two different pieces of data. For example, the first value of the second analysis result is 1, and the second value of the second analysis result is 0. Alternatively, the first value of the second analysis result is 0, and the second value of the second analysis result is 1.

Figure 7:
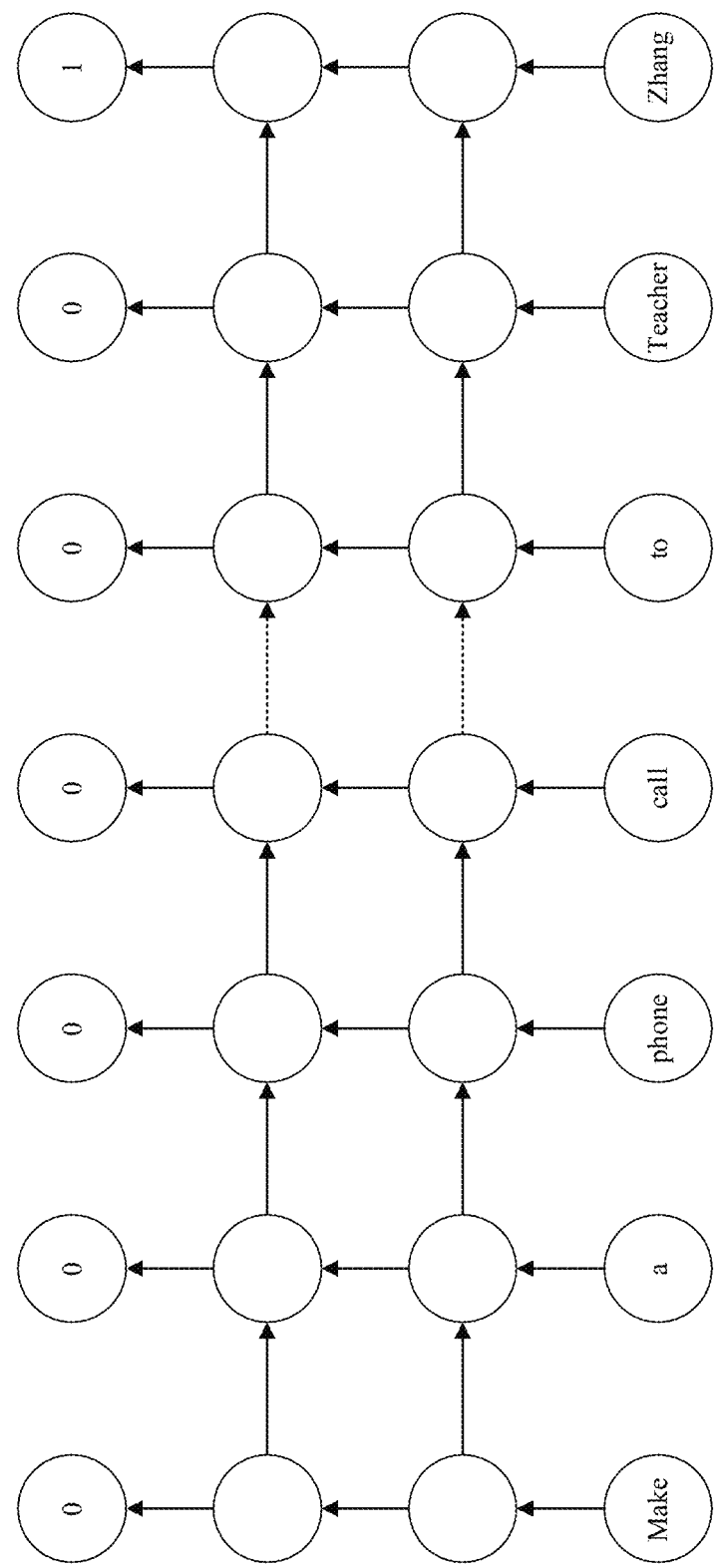
FIG. 7 is a schematic diagram of syntax analysis according to an embodiment of this disclosure.

For example, referring to FIG. 7, using an example in which the first value is 1 and the second value is 0, if a plurality of words obtained through word segmentation are "make", "a", "phone", "call", "to", "Teacher", and "Zhang", it can be learned through syntax analysis that a second analysis result corresponding to "make" is 0, a second analysis result corresponding to "a" is 0, a second analysis result corresponding to "phone" is 0, a second analysis result corresponding to "call" is 0, a second analysis result corresponding to "to" is 0, a second analysis result corresponding to "Teacher" is 0, and a second analysis result corresponding to "Zhang" is 1. For another example, referring to FIG. 8, if a plurality of words obtained through word segmentation are "perform", "navigation", "to", "Golden", "Sea", "Road", "Golden", "Ear", and "Road", it can be learned through syntax analysis that a second analysis result corresponding to "perform" is 0, a second analysis result corresponding to "navigation" is 0, a second analysis result corresponding to "to" is 0, a second analysis result corresponding to "Golden" is 0, a second analysis result corresponding to "Sea" is 0, a second analysis result corresponding to "Road" (which is the "Road" in "Golden Sea Road") is 1, a second analysis result corresponding to "Golden" is 0, a second analysis result corresponding to "Ear" is 0, and a second analysis result corresponding to "Road" (which is the "Road" in "Golden Ear Road") is 1.

In some embodiments, syntax analysis may be performed in a streaming detection manner. A specific process of streaming detection may include the following. The electronic device may traverse all words from the first word in the third text information, perform text analysis on a currently traversed word and each previous word, and output a second analysis result corresponding to the currently traversed word. If the second analysis result corresponding to the currently traversed word indicates that no complete statement is formed, the electronic device continues to traverse a next word until the last word is traversed, or until a second analysis result corresponding to a traversed word indicates that a complete statement is formed. If the second analysis result corresponding to the currently traversed word indicates that a complete statement is formed, the electronic device may determine that the third text information is a complete statement, and stop traversing.

For example, referring to FIG. 7, the third text information is "make", "a", "phone", "call", "to", "Teacher", and "Zhang". In a process of streaming detection, when "make" is recognized, it is predicted that syntax of "make" is incomplete, and 0 is output, when "a" is recognized, it is predicted that syntax of "make a" is incomplete, and 0 is output, when "phone" is recognized, it is predicted that syntax of "make a phone" is incomplete, and 0 is output, when "call" is recognized, it is predicted that syntax of "make a phone call" is incomplete, and 0 is output, when "to" is recognized, it is predicted that syntax of "make a phone call to" is incomplete, and 0 is output, when "Teacher" is recognized, it is predicted that syntax of "make a phone call to Teacher" is incomplete, and 0 is output, and when "Zhang" is recognized, it is predicted that syntax of "make a phone call to Teacher Zhang" is complete, and 1 is output.

Figure 8:
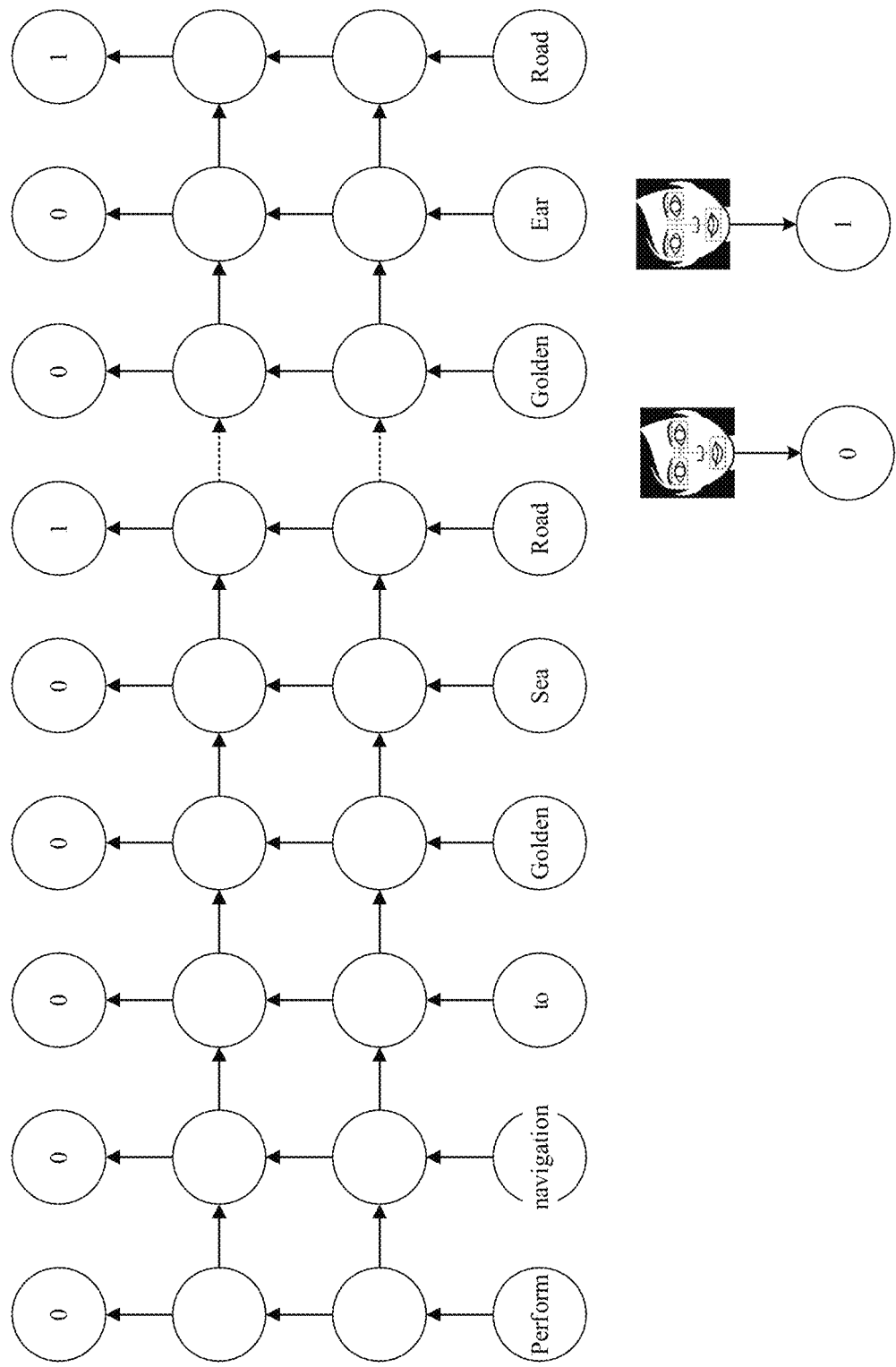
FIG. 8 is a schematic diagram of syntax analysis according to an embodiment of this disclosure.

For another example, referring to FIG. 8, the third text information is "perform", "navigation", "to", "Golden", "Sea", "Road", "Golden", "Ear", and "Road". In a process of streaming detection, when "perform" is recognized, it is predicted that syntax of "perform" is incomplete, and 0 is output, when "navigation" is recognized, it is predicted that syntax of "perform navigation" is incomplete, and 0 is output, when "to" is recognized, it is predicted that syntax of "perform navigation to" is incomplete, and 0 is output, when "Golden" is recognized, it is predicted that syntax of "perform navigation to Golden" is incomplete, and 0 is output, when "Sea" is recognized, it is predicted that syntax of "perform navigation to Golden Sea" is incomplete, and 0 is output, when "Road" is recognized, it is predicted that syntax of "perform navigation to Golden Sea Road" is complete, and 1 is output, when "Golden" is recognized, it is predicted that syntax of "perform navigation to Golden Sea Road Golden" is incomplete, and 0 is output, when "Ear" is recognized, it is predicted that syntax of "perform navigation to Golden Sea Road Golden Ear" is incomplete, and 0 is output, and when "Road" is recognized, it is predicted that syntax of "perform navigation to Golden Sea Road Golden Ear Road" is complete, and 1 is output.

Step 3: For each of the plurality of words, the electronic device determines whether a second word segmentation result corresponding to the word indicates that a complete statement is formed, and performs the following step 4 if a second analysis result corresponding to any one of the plurality of words indicates that a complete statement is formed, or performs the following step 5 if a second analysis result corresponding to each of the plurality of words indicates that no complete statement is formed.

Step 4: The electronic device determines that the third text information is a complete statement.

Step 5: The electronic device determines that the third text information is not a complete statement.

An effect achieved through syntax analysis by performing the foregoing steps 1 to 5 may include at least the following. Not only a syntactic relationship between each word and a previous word is comprehensively considered, but also an N-best algorithm is used. Each time a word is detected, whether the word and a previous word form a complete statement is determined. Once a current word indicates that a complete statement is formed, it may be determined that analyzed text information is a complete statement, and a next-step detection procedure may be performed. In this way, when a current audio signal has a probability of being a speech end point, the speech end point can be detected in a timely manner. This ensures real-time detection of a speech end point, and avoids delayed detection of a speech end point.

Step 605: The electronic device determines whether the first analysis result indicates that the third text information is a complete statement.

If the first analysis result indicates that the third text information is not a complete statement, the electronic device may determine that the audio signal is not the speech end point. If the first analysis result indicates that the third text information is a complete statement, the electronic device may determine that the audio signal has a probability of being the speech end point, and perform step 606 to perform facial recognition.

For example, referring to FIG. 8, when "perform" is recognized, 0 is output, and the electronic device determines that no complete statement is detected, and continues to traverse a next word. When "navigation" is recognized, 0 is output, and the electronic device determines that no complete statement is detected, and continues to traverse a next word. When "to" is recognized, 0 is output, and the electronic device determines that no complete statement is detected, and continues to traverse a next word. When "Golden" is recognized, 0 is output, and the electronic device determines that no complete statement is detected, and continues to traverse a next word. When "Sea" is recognized, 0 is output, and the electronic device determines that no complete statement is detected, and continues to traverse a next word. When "Road" is recognized, 1 is output, and the electronic device performs step 606 and step 607. Through the facial recognition step, a prediction result output by the prediction model is 0, indicating that the user intends to continue speaking. In this case, the electronic device continues to traverse a next word. When "Golden" is recognized, 0 is output, and the electronic device determines that no complete statement is detected, and continues to traverse a next word. When "Ear" is recognized, 0 is output, and the electronic device determines that no complete statement is detected, and continues to traverse a next word. When "Road" is recognized, 1 is output, and the electronic device performs step 606 and step 607. Through the facial recognition step, a prediction result output by the prediction model is 1, indicating that the user does not intend to continue speaking. In this case, the electronic device determines that a speech end point is detected.

It can be learned from the foregoing descriptions that at least the following effect can be achieved by detecting a speech end point by implementing a syntax analysis method provided in this embodiment. It can be learned from the example in FIG. 8 that syntactic completeness of a statement that includes a current word and a previous word cannot be used as an only basis for determining that the current word is a speech end point. For example, an actual intention of the user is to "perform navigation to Golden Sea Road Golden Ear Road". Although syntax of the sentence segment "perform navigation to Golden Sea Road" is complete, "Road" in "Golden Sea Road" is not the actual speech end point, and "Road" in "Golden Ear Road" is the actual speech end point. "Perform navigation to Golden Sea Road Golden Ear Road" is a complete voice instruction. However, if a method provided in a related technology is implemented, that is, only acoustic information is used as a basis, when "perform navigation to Golden Sea Road" is detected, "Road" in "Golden Sea Road" may be mistakenly determined as the speech end point. As a result, the voice instruction is split into "perform navigation to Golden Sea Road" and "Golden Ear Road". Consequently, the user intention is distorted, and a wrong location is navigated to. By contrast, according to the method provided in this embodiment, a procedure of performing facial recognition by applying the prediction model may be triggered when it is detected that syntax of the audio signal is complete, so as to further determine, by using a prediction result, whether the audio signal actually reaches the speech end point. In this way, a case of mistaken determining in syntax analysis is avoided by incorporating a visual-modal feature. This greatly improves accuracy of speech end point detection, and reduces a probability that a voice instruction is prematurely truncated. In addition, the foregoing syntax analysis method is easy to implement, and is highly practical.

Step 606: If the first analysis result indicates that the third text information is a complete statement, the electronic device inputs the face image into the prediction model.

Step 607: The electronic device processes the face image by using the prediction model, and outputs a prediction result.

In the model training phase, the prediction model learns a mapping relationship between a face image and a user intention by using a sample and a label. Therefore, in step 607, the prediction model may perform recognition on the face image based on the learned mapping relationship, and determine the user intention corresponding to the face image, thereby predicting whether the user intends to continue speaking.

In some embodiments, a specific process of processing performed by the prediction model may include the following steps 1 to 4.

Step 1: Extract a key point included in the face image.

Step 2: Process the key point to obtain action features of the face image.

A specific process of mining the action features from the face image may include a plurality of implementations. For example, the action features may be obtained by performing the following steps (1) to (4).

(1): Input the face image into a key-point extraction module in the prediction model, and extract a key-point feature from the face image by using the key-point extraction module.

The key-point feature may be in any data form, including but not limited to a one-dimensional vector, a two-dimensional feature graph, or a three-dimensional feature cube. There may be a plurality of key points in the face image. When step (1) is performed, a feature of each of the plurality of key points may be extracted.

(2): Input the key-point feature to an input layer, and send the key-point feature to a first hidden layer by using the input layer.

Referring to FIG. 5, the feature of the key point 1, the feature of the key point 2, the feature of the key point 3, . . . , and the feature of the key point n may be input to the input layer. The node FP1 of the input layer receives the feature of the key point 1, and sends the feature to the hidden layer. The node FP2 receives the feature of the key point 2, and sends the feature to the hidden layer. The node FP3 receives the feature of the key point 3, and sends the feature to the hidden layer. The rest may be deduced by analogy. The node FPn receives the feature of the key point n, and sends the feature to the hidden layer.

(3): Perform linear mapping and non-linear mapping on the key-point feature by using the first hidden layer, to obtain a mapped key-point feature, and send the mapped key-point feature to an action recognition layer.

(4): Perform recognition on the mapped key-point feature by using the action recognition layer, to obtain the action features.

For example, referring to FIG. 5, the action recognition layer may include N action units, which are respectively denoted by $AU_1, AU_2, AU_3, \ldots,$ and $AU_n$. After performing recognition on the mapped key-point feature, the action unit $AU_1$ outputs $PAU_1$. If an output result of the action unit $AU_1$ is greater than an output result of NEU, that is, $PAU_1$ is greater than PNEU, the output result of $PAU_1$ is valid. After performing recognition on the mapped key-point feature, the action unit $AU_2$ outputs $PAU_2$. If an output result of the action unit $AU_2$ is greater than the output result of the NEU, that is, $PAU_2$ is greater than PNEU, the output result of $PAU_2$ is valid. The rest may be deduced by analogy. After performing recognition on the mapped key-point feature, the action unit NEU outputs PNEU. Output results of other action units may be compared with PNEU. Valid output results of action units are summed, and an obtained sum is the action features.

Each action unit of the action recognition layer may correspond to one key muscle point in a face, and each action unit can identify a change in the corresponding key muscle point. For example, the AU1 can identify lifting of muscles of an upper lip and a philtrum area, the AU2 can identify falling of a jaw, the AU3 can identify stretching of a mouth corner, the AU4 can identify lowering and frowning of eyebrows, the AU5 can identify pulling downward of a mouth corner, and the AU6 can identify raising of an outer corner of an eyebrow. An identification result of an AU is indicated by a value of a probability that is output. For example, larger $PAU_1$ indicates a higher probability that muscles of an upper lip and a philtrum area on a face are lifted. For different user facial micro-expressions, the AUs of the action recognition layer output different probabilities. For example, if a current user facial expression is joy, because a mouth corner on a face is usually lifted in joy, $PAU_1$ is larger, and therefore, this can be identified by using $PAU_1$.

Step 3: Classify action features to obtain confidence degrees that respectively correspond to different types.

Step 4: Determine the prediction result based on the confidence degrees.

For example, the action features may be classified to obtain a confidence degree corresponding to a first type and a confidence degree corresponding to a second type. The first type means that the user intends to continue speaking, and the second type means that the user does not intend to continue speaking. The confidence degree corresponding to the first type may be compared with the confidence degree corresponding to the second type. If the confidence degree corresponding to the first type is greater than the confidence degree corresponding to the second type, that the user intends to continue speaking is output as the prediction result. If the confidence degree corresponding to the first type is not greater than the confidence degree corresponding to the second type, that the user does not intend to continue speaking is output as the prediction result.

For example, referring to FIG. 5, the action features may be input to the second hidden layer. Non-linear mapping and linear mapping are performed on the action features by using the second hidden layer, to obtain the mapped action features. The mapped action features are classified by using the output layer, and an obtained type may be the prediction result of the prediction model. If the type is that the user intends to continue speaking, it indicates that the current audio signal has not reached the speech end point. If the type is that the user does not intend to continue speaking, the currently identified audio signal is used as the speech end point.

An effect achieved by performing prediction by the prediction model by using the foregoing steps 1 to 4 may include at least the following.

If a segment of speech includes a pause, during speech syntax analysis, whether an audio signal is the pause or a speech end point cannot be determined. In the foregoing method, a key-point feature and action features of a face are incorporated, so that a micro-expression included on the face can be accurately identified based on a current action of the face, so as to deduce a mental state of a user based on the expression, and further predict whether the user intends to continue speaking. According to this method, visual information is used to assist in determining, thereby resolving a problem that cannot be resolved in syntax analysis, and reducing premature truncation of speech.

Step 608: If the prediction result indicates that the user does not intend to continue speaking, the electronic device determines that the audio signal is the speech end point.

When determining that the audio signal is the speech end point, the electronic device may perform any service processing function corresponding to speech ending. For example, the electronic device may return a speech detection result to the user, or output a speech detection result to a subsequent module. For example, the electronic device may capture, from audio, a part between a speech start point and the speech end point, obtain a voice instruction through parsing, and perform service processing in response to the voice instruction.

Figure 9:
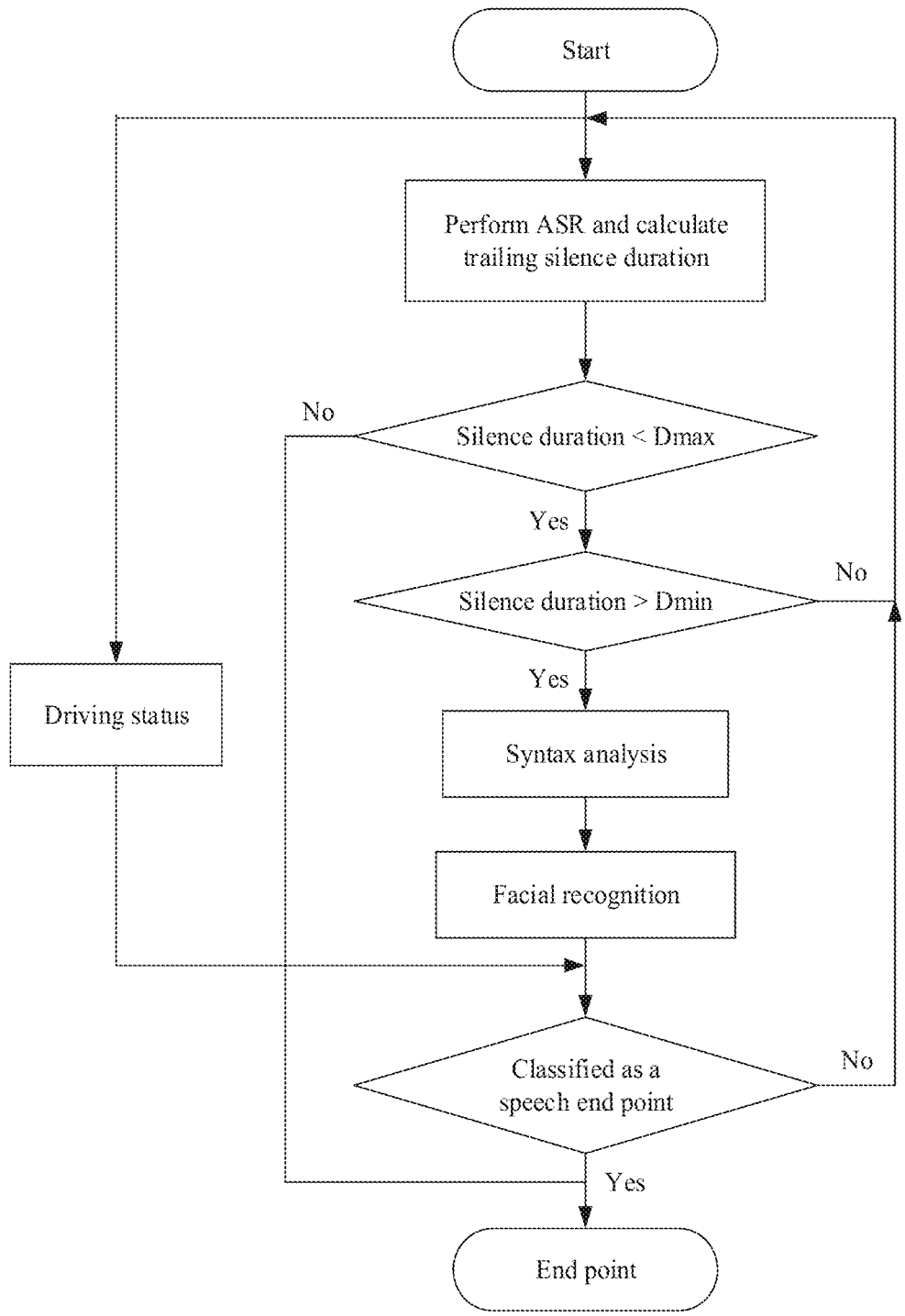
FIG. 9 is a flowchart of a speech detection method according to an embodiment of this disclosure.

In some embodiments, a speech detection method procedure may be shown in FIG. 9, including the following five steps.

Step 1: Perform speech recognition (ASR) on an audio signal to obtain a streaming N-best result and trailing silence duration.

Step 2: Compare the trailing silence duration with a maximum silence duration threshold Dmax, and perform step 5 if the trailing silence duration is greater than Dmax, or perform step 3 if the trailing silence duration is not greater than Dmax.

Step 3: Compare the trailing silence duration with a minimum silence duration threshold Dmin, and perform step 1 if the trailing silence duration is less than Dmin, or perform step 4 if the trailing silence duration is not less than Dmin.

Step 4: Analyze the N-best result of speech recognition, a facial action unit, and a facial key point, classify the audio signal, and perform step 5 if a condition corresponding to a speech end point is met, or perform step 1 if a condition corresponding to a speech end point is not met.

Step 5: Detect the speech end point.

Optionally, a driving status may be further considered. In a process of performing step 4, comprehensive determining is performed based on the driving status. For details, refer to the following embodiment in FIG. 11.

This embodiment provides a multi-modal speech end point detection method. Recognition is performed on the photographed face image by using the model, so as to predict whether the user intends to continue speaking. Whether the collected audio signal is the speech end point is determined with reference to the prediction result. Because detection is performed not only based on an acoustic feature but also based on a visual-modal feature such as the face image, even if background noise is strong or the user pauses during speech, whether a speech signal is the speech end point can still be accurately determined by using the face image. Therefore, interference caused by background noise and a pause in speech is avoided, to avoid a problem, of delayed or premature detection of an ended state of speech interaction, resulting from interference caused by background noise and a pause in speech. This improves accuracy of speech end point detection. In addition, because a problem that speech end point detection is inaccurate during speech interaction is resolved, a problem that a response delay is excessively long because of delayed detection of a speech end point is avoided. This shortens a speech interaction delay, improves speech interaction smoothness, and avoids a problem that a voice instruction is prematurely truncated because of premature detection of a speech end point. Therefore, misunderstanding of a user intention is avoided, and speech interaction accuracy is improved.

The prediction model provided in the foregoing method embodiment may be applied to any scenario in which speech detection needs to be performed. An example application scenario is used as an example for description below.

Figure 10A:
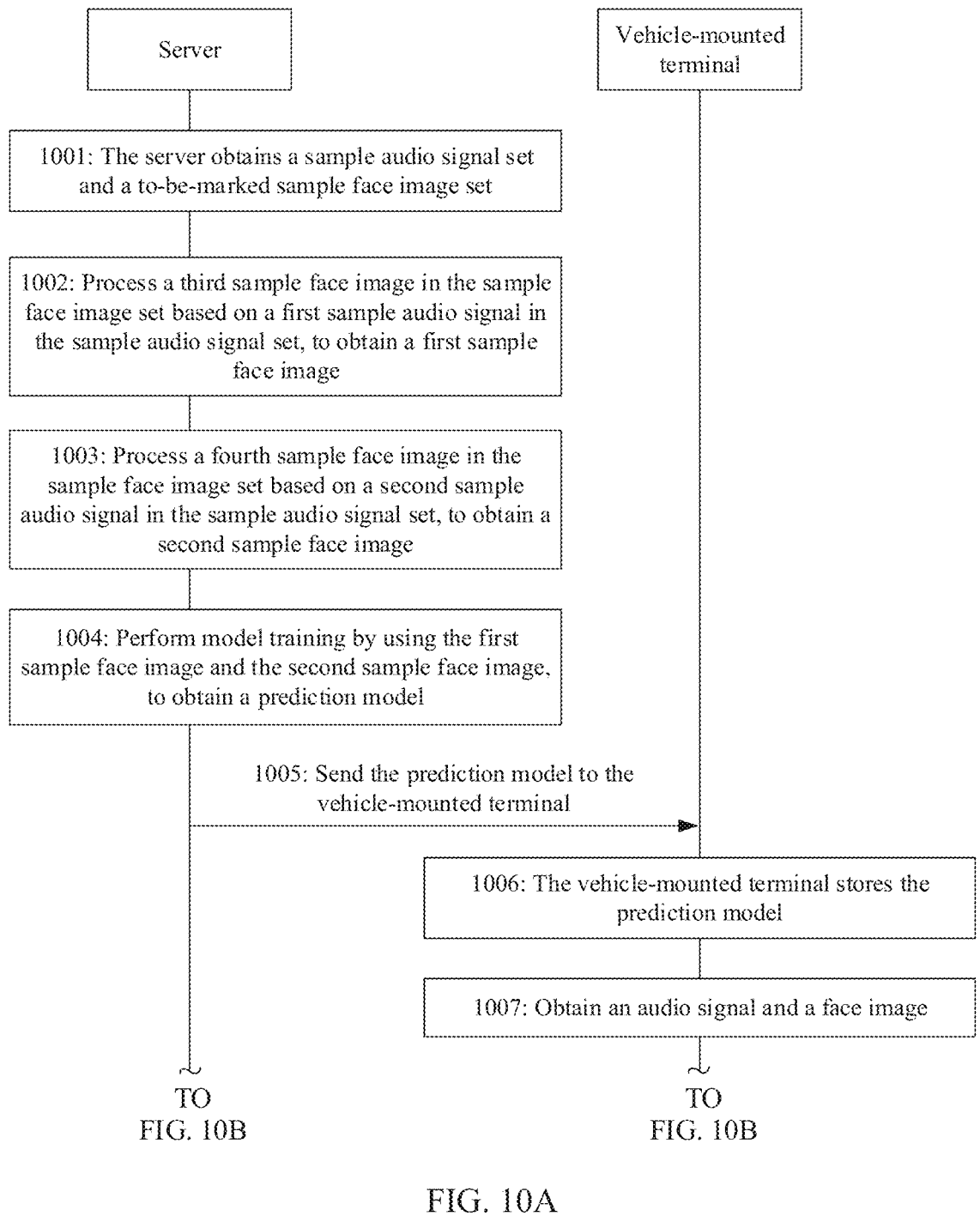

FIG. 10A and FIG. 10B are a flowchart of a speech detection method in an in-vehicle scenario according to an embodiment of this disclosure. Interaction bodies of the method include a vehicle-mounted terminal and a server, and the method includes the following steps.

Step 1001: The server obtains a sample audio signal set and a to-be-marked sample face image set.

Step 1002: The server processes a third sample face image in the sample face image set based on a first sample audio signal in the sample audio signal set, to obtain a first sample face image.

Step 1003: The server processes a fourth sample face image in the sample face image set based on a second sample audio signal in the sample audio signal set, to obtain a second sample face image.

Step 1004: The server performs model training by using the first sample face image and the second sample face image, to obtain a prediction model.

Step 1005: The server sends the prediction model to the vehicle-mounted terminal.

Step 1006: The vehicle-mounted terminal receives the prediction model, and stores the prediction model.

Step 1007: The vehicle-mounted terminal obtains an audio signal and a face image.

Step 1008: The vehicle-mounted terminal performs speech recognition on the audio signal to obtain third text information corresponding to the audio signal, and detects trailing silence duration of the audio signal.

Step 1009: The vehicle-mounted terminal compares the trailing silence duration with a corresponding threshold.

Step 1010: If the trailing silence duration is greater than a third threshold, the vehicle-mounted terminal performs syntax analysis on the third text information to obtain a first analysis result.

In this embodiment, a vehicle driving status may be considered to comprehensively perform speech end point detection. In some embodiments, the vehicle-mounted terminal may collect driving status information, and adjust, based on the driving status information, the threshold corresponding to the trailing silence duration, for example, adjust the third threshold. The driving status information indicates a driving status of a vehicle with the vehicle-mounted terminal. A sensor may be configured for the vehicle-mounted terminal, and the driving status information may be collected by using the sensor.

An effect achieved in the foregoing manner may include at least the following. Endpoint detection may be performed based on a specific application scenario of speech detection. For example, when speech detection is applied in the in-vehicle scenario, the trailing silence duration threshold may be adjusted based on a driving status in a driving process, so that the threshold can be adaptively adjusted based on the current driving status. This improves robustness of speech endpoint detection.

The driving status information may have at least one specific meaning. The following uses a manner 1 and a manner 2 as examples for description.

Manner 1: Adjustment is performed on the third threshold if the driving status information indicates that a sharp turn occurs, where an adjusted third threshold is greater than the before-adjustment third threshold.

If the vehicle sharply turns, speech of a user is likely to be interrupted due to the sharp turn. As a result, a probability that a speech end point appears is increased, and speech interruption duration is correspondingly prolonged. In this case, an adjusted threshold can be adapted to a sharp turn status by increasing the trailing silence duration threshold. The vehicle-mounted terminal may be configured with an accelerometer sensor, and the sharp turn status may be collected by using the accelerometer sensor.

Manner 2: Adjustment is performed on the third threshold if the driving status information indicates that abrupt braking occurs, where an adjusted third threshold is greater than the before-adjustment third threshold.

If the vehicle abruptly brakes, speech of a user is likely to be interrupted due to the abrupt braking. As a result, a probability that a speech end point appears is increased, and speech interruption duration is correspondingly prolonged. In this case, an adjusted threshold can be adapted to an abrupt braking status by increasing the trailing silence duration threshold. The vehicle-mounted terminal may be configured with an accelerometer sensor, and the abrupt braking status may be collected by using the accelerometer sensor.

The manner 1 may be implemented, or the manner 2 may be implemented, or a combination of the manner 1 and the manner 2 may be implemented.

Step 1011: The vehicle-mounted terminal determines whether the first analysis result indicates that the third text information is a complete statement.

Step 1012: If the first analysis result indicates that the third text information is a complete statement, the vehicle-mounted terminal inputs the face image into the prediction model.

Step 1013: The vehicle-mounted terminal processes the face image by using the prediction model, and outputs a prediction result.

Step 1014: If the prediction result indicates that the user does not intend to continue speaking, the vehicle-mounted terminal determines that the audio signal is the speech end point.

Optionally, an out-of-vehicle environment may be considered to comprehensively perform speech end point detection. In some embodiments, the vehicle-mounted terminal may collect environment information, where the environment information indicates an environment in which the vehicle with the vehicle-mounted terminal is located. The vehicle-mounted terminal may adjust a parameter of the prediction model based on the environment information. The vehicle-mounted terminal may be configured with an event data recorder, and a status of the out-of-vehicle environment may be collected by using the event data recorder. In addition, different from a model parameter adjustment process in a training phase, a manner of adjustment based on the environment information may be model fine-tuning.

For example, if the environment information indicates that a traffic jam occurs, the vehicle-mounted terminal may adjust a decision threshold of a third classifier in the prediction model. The third classifier is configured to determine, when input data is greater than the decision threshold, that the user intends to continue speaking, or determine, when input data is less than or equal to the decision threshold, that the user does not intend to continue speaking. For example, referring to FIG. 5, the third classifier may be a node of the output layer.

An effect achieved through parameter adjustment with reference to the out-of-vehicle environment may include at least the following. In a vehicle driving process, the out-of-vehicle environment affects emotion of a driver. For example, a probability that the driver is irritated in a traffic jam scenario is higher than a probability that the driver is irritated in a traffic flowing scenario. A change in emotion affects a facial recognition process. In this case, the parameter of the prediction model is adjusted with reference to the out-of-vehicle environment, so that a process of performing facial recognition by the prediction model can match the current out-of-vehicle environment. This improves prediction result accuracy of the prediction model.

It should be noted that this embodiment is described by using the in-vehicle scenario as an example. This solution may be widely applied to various scenarios with speech interaction, and may be generally implemented. In another speech interaction scenario, scenario information may be further used for speech end point detection. For example, if this solution is used for a smart speaker or a robot, a speech end point may be detected with reference to acoustic source information or sound field information.

This embodiment provides a multi-modal speech end point detection method in the in-vehicle scenario. Recognition is performed on the photographed face image by using the model, so as to predict whether the user intends to continue speaking. Whether the collected audio signal is the speech end point is determined with reference to the prediction result. Because detection is performed not only based on an acoustic feature but also based on a visual-modal feature such as the face image, even if background noise is strong or the user pauses during speech, whether a speech signal is the speech end point can still be accurately determined by using the face image. Therefore, interference caused by background noise and a pause in speech is avoided, to avoid a problem, of delayed or premature detection of an ended state of speech interaction, resulting from interference caused by background noise and a pause in speech. This improves accuracy of speech end point detection. In addition, because a problem that speech end point detection is inaccurate during speech interaction is resolved, a problem that a response delay is excessively long because of delayed detection of a speech end point is avoided. This shortens a speech interaction delay, improves speech interaction smoothness, and avoids a problem that a voice instruction is prematurely truncated because of premature detection of a speech end point. Therefore, misunderstanding of a user intention is avoided, and accuracy of speech interaction in the in-vehicle scenario is improved.

The foregoing describes the speech detection method provided in this embodiment, and the following describes a software architecture of the speech detection method by using an example.

Figure 11:
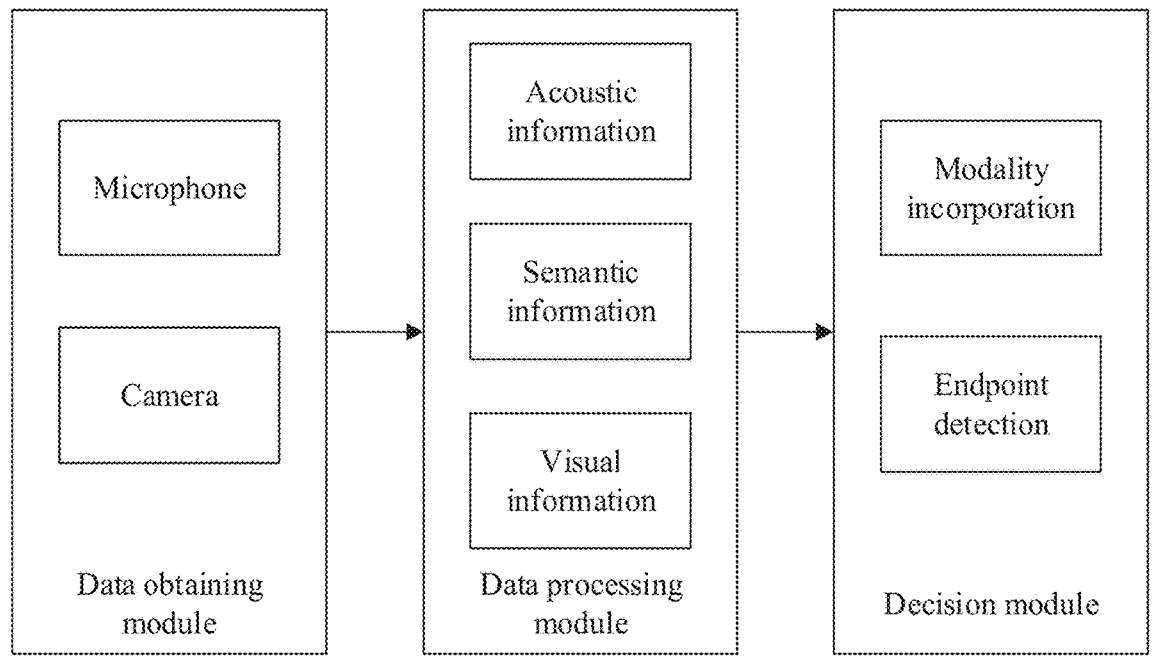
FIG. 11 is a software architectural diagram of a speech detection method according to an embodiment of this disclosure.

Referring to FIG. 11, the software architecture may include a plurality of function modules, for example, may include a data obtaining module, a data processing module, and a decision module. Each function module may be implemented by using software.

The data obtaining module is configured to collect an audio stream in real time by using a microphone, and shoot a video stream in real time by using a camera. The data obtaining module may transmit the audio stream and the video stream to the data processing module. The data processing module may extract multi-modal information, for example, acoustic information, semantic information, and visual information, based on the audio stream and the video stream by using a data processing capability and a device control capability that are provided by a central processing unit, and transmit the multi-modal information to the decision module. The decision module may determine, based on a combination of information of different modalities, whether a current audio signal is a speech endpoint.

Figure 12:
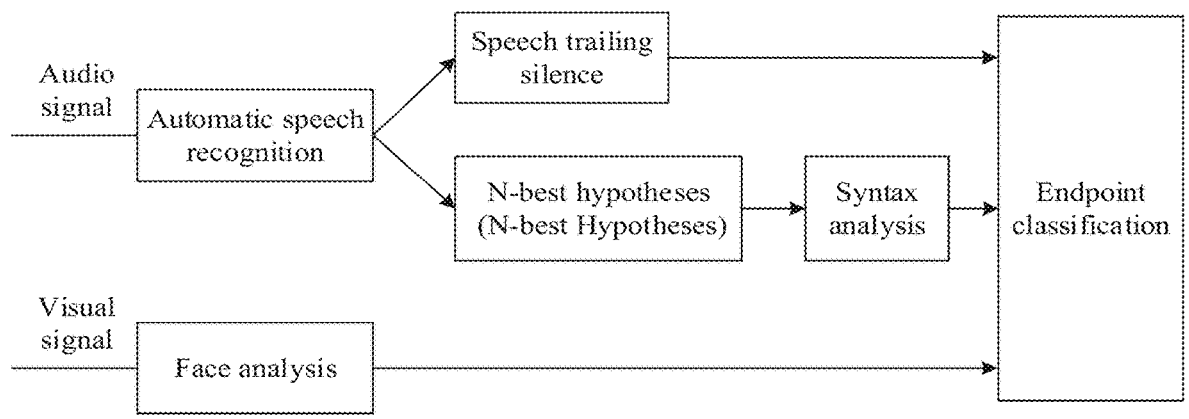
FIG. 12 is a flowchart of a speech detection method according to an embodiment of this disclosure.

FIG. 12 is a flowchart of performing, by a machine, speech end point detection based on the foregoing software architecture. As shown in FIG. 12, automatic speech recognition may be performed on an audio signal, to obtain speech trailing silence duration and an N-best result of text information, syntax analysis is performed based on the N-best result, and the current audio signal may be classified based on an analysis result and a magnitude relationship between the duration and a threshold, where a type is a speech end point or a non-speech end point.

The foregoing describes the speech detection method in the embodiments of this disclosure. The following describes a speech detection apparatus in the embodiments of this disclosure. It should be understood that the applied speech detection apparatus has any function of a speech detection device in the foregoing methods.

Figure 13:
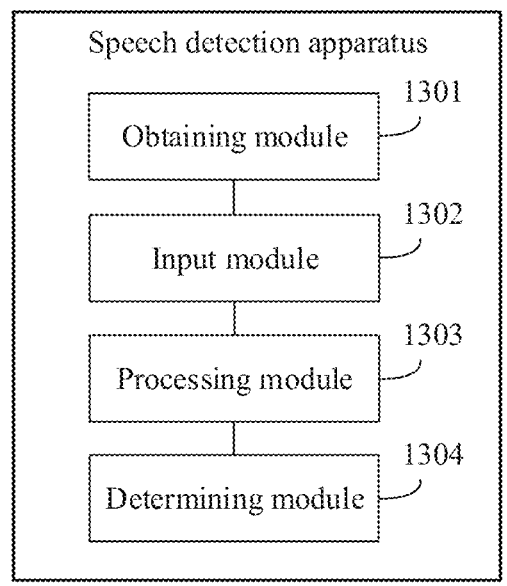
FIG. 13 is a schematic structural diagram of a speech detection apparatus according to an embodiment of this disclosure.

FIG. 13 is a schematic structural diagram of a speech detection apparatus according to an embodiment of this disclosure. As shown in FIG. 13, the speech detection apparatus includes an obtaining module 1301, configured to perform step 601 or step 1007 in the foregoing method embodiment, an input module 1302, configured to perform step 606 or step 1012, a processing module 1303, configured to perform step 607 or step 1013, and a determining module 1304, configured to perform step 608 or step 1014.

Optionally, the processing module includes an extraction submodule, configured to perform step 1 in step 607, a processing submodule, configured to perform step 2 in step 607, and a classification submodule, configured to perform step 3 in step 607.

Optionally, the obtaining module is further configured to perform step 201, and the apparatus further includes a training module, configured to perform step 202.

Optionally, a first sample face image meets a first condition.

Optionally, a second sample face image meets a second condition.

Optionally, the apparatus further includes a speech recognition module, configured to perform a speech recognition step, and a syntax analysis module, configured to perform a syntax analysis step. The determining module is further configured to, if a syntax analysis result indicates that no complete statement is formed, determine that an audio signal is not a speech end point, or if a syntax analysis result indicates that a complete statement is formed, trigger the input module 1302 to perform step 606 or step 1012.

Optionally, the syntax analysis module is configured to perform step 1 to step 5 in syntax analysis.

Optionally, a trigger condition for inputting a face image into a prediction model includes a trailing silence duration of the audio signal is detected, and it is determined that the trailing silence duration is greater than a third threshold.

Optionally, the apparatus is applied to a vehicle-mounted terminal. The apparatus further includes a first collection module, configured to collect driving status information, and a first adjustment module, configured to adjust the third threshold based on the driving status information.

Optionally, the first adjustment module is configured to adjust the third threshold if the driving status information indicates that a sharp turn occurs, or adjust the third threshold if the driving status information indicates that abrupt braking occurs.

Optionally, the apparatus is applied to a vehicle-mounted terminal. The apparatus further includes a second collection module, configured to collect environment information, and a second adjustment module, configured to adjust a parameter of the prediction model based on the environment information.

Optionally, the second adjustment module is configured to adjust a decision threshold of a third classifier in the prediction model if the environment information indicates that a traffic jam occurs.

It should be understood that the speech detection apparatus provided in the embodiment in FIG. 13 corresponds to the speech detection apparatus in the foregoing method embodiment. The modules in the speech detection apparatus and the foregoing other operations and/or functions are respectively used to implement various steps and methods implemented by the speech detection apparatus in the method embodiment. For specific details, refer to the foregoing method embodiment. For brevity, details are not described herein again.

It should be understood that, when the speech detection apparatus provided in the embodiment in FIG. 13 detects speech, only division into the foregoing function modules is used as an example for description. During actual application, the functions may be allocated to and implemented by different function modules depending on a requirement. To be specific, an internal structure of the speech detection apparatus is divided into different function modules to implement all or some of the functions described above. In addition, the speech detection apparatus provided in the foregoing embodiment and the speech detection method embodiment belong to a same idea. For a specific implementation process of the speech detection apparatus, refer to the method embodiment. Details are not described herein again.

Figure 14:
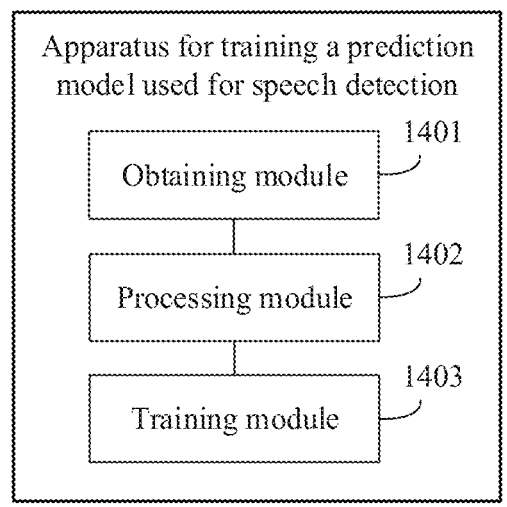
FIG. 14 is a schematic structural diagram of an apparatus for training a prediction model used for speech detection according to an embodiment of this disclosure.

FIG. 14 is a schematic structural diagram of an apparatus for training a prediction model used for speech detection according to an embodiment of this disclosure. As shown in FIG. 14, the speech detection apparatus includes an obtaining module 1401, configured to perform step 201 in the method embodiment in FIG. 2 or step 1001 in the embodiment in FIG. 10A and FIG. 10B, a processing module 1402, configured to perform step 202 and step 203 in the method embodiment in FIG. 2, or step 1002 and step 1003 in the embodiment in FIG. 10A and FIG. 10B, and a training module 1403, configured to perform step 204 in the method embodiment in FIG. 2 or step 1004 in the embodiment in FIG. 10A and FIG. 10B.

Optionally, a first sample audio signal meets a first condition.

Optionally, a second sample audio signal meets a second condition.

Optionally, a first sample face image meets a third condition.

It should be understood that the apparatus for training a prediction model used for speech detection provided in the embodiment in FIG. 14 corresponds to the electronic device in the method embodiment in FIG. 2. The modules in the apparatus for training a prediction model used for speech detection and the foregoing other operations and/or functions are respectively used to implement various steps and methods implemented by the electronic device in the method embodiment in FIG. 2 in the method embodiments. For specific details, refer to the method embodiment in FIG. 2. For brevity, details are not described herein again.

It should be understood that, when the apparatus for training a prediction model used for speech detection provided in the embodiment in FIG. 14 trains a prediction model used for speech detection, only division into the foregoing function modules is used as an example for description. During actual application, the functions may be allocated to and implemented by different function modules depending on a requirement. To be specific, an internal structure of the apparatus for training a prediction model used for speech detection is divided into different function modules to implement all or some of the functions described above. In addition, the apparatus for training a prediction model used for speech detection provided in the foregoing embodiment and the foregoing embodiment of the method for training a prediction model used for speech detection belong to a same idea. For a specific implementation process of the apparatus, refer to the method embodiment. Details are not described herein again.

The foregoing describes the electronic device in the embodiments of this disclosure, and the following describes possible product forms of the electronic device.

It should be understood that all forms of products having characteristics of the foregoing electronic device fall within the protection scope of this disclosure. It should be further understood that the following descriptions are merely examples, and a product form of the electronic device in the embodiments of this disclosure is not limited thereto.

An embodiment of this disclosure provides an electronic device. The electronic device includes a processor. The processor is configured to execute an instruction, so that the electronic device performs the speech detection method provided in the foregoing method embodiments.

For example, the processor may be a general-purpose central processing unit (CPU), a network processor (NP), or a microprocessor, or may be one or more integrated circuits configured to implement the solutions in this disclosure, for example, an application-specific integrated circuit (ASIC), a programmable logic device (PLD), or a combination thereof. The PLD may be a complex PLD (CPLD), a field-programmable gate array (FPGA), a generic array logic (GAL), or any combination thereof. The processor may be a single-core (single-CPU) processor, or may be a multi-core (multi-CPU) processor. There may be one or more processors.

In some possible embodiments, the electronic device may further include a memory.

The memory may be a read-only memory (ROM), another type of static storage device that can store static information and an instruction, a random-access memory (RAM), or another type of dynamic storage device that can store information and an instruction, or may be an electrically erasable programmable ROM (EEPROM), a compact disc (CD) ROM (CD-ROM) or another CD storage, an optical disc storage (including a compact optical disc, a laser disc, an optical disc, a DIGITAL VERSATILE DISC (DVD), a BLU-RAY disc, and the like), a magnetic disk storage medium or another magnetic storage device, or any other medium that can be used to carry or store expected program code in a form of an instruction or a data structure and that can be accessed by a computer. However, the memory is not limited thereto.

The memory and the processor may be separately disposed, or the memory and the processor may be integrated together. In some possible embodiments, the electronic device may further include a transceiver. The transceiver is configured to communicate with another device or a communications network. A network communication manner may be but is not limited to an Ethernet network, a radio access network (RAN), a wireless local area network (WLAN), or the like.

In some possible embodiments, the electronic device performing the embodiment in FIG. 2, the embodiment in FIG. 6, or the embodiment in FIG. 10A and FIG. 10B may be implemented as a terminal. The following describes a hardware structure of the terminal by using an example.

Figure 15:
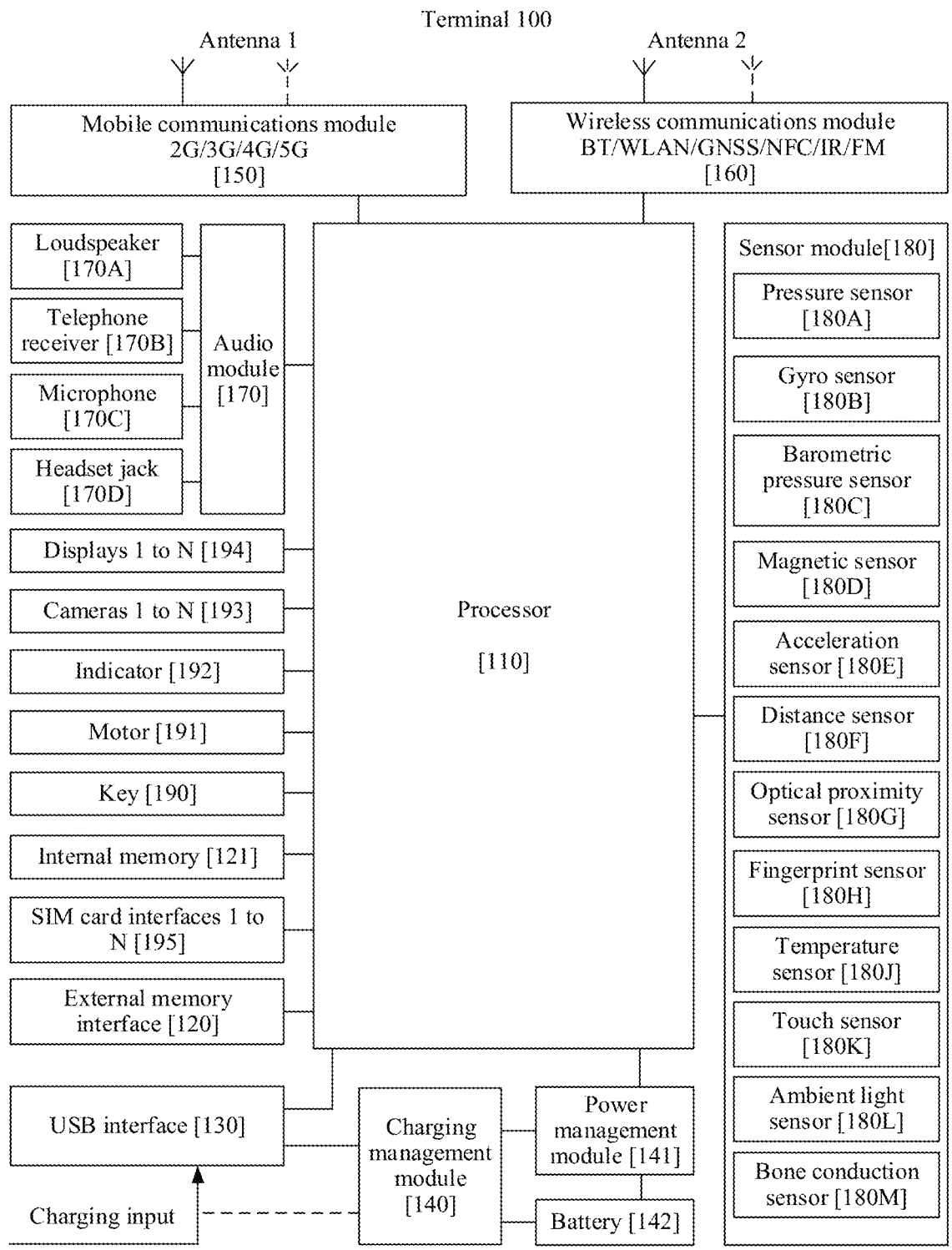
FIG. 15 is a schematic structural diagram of a terminal according to an embodiment of this disclosure.

FIG. 15 is a schematic structural diagram of a terminal 100 according to an embodiment of this disclosure. The terminal 100 may be the vehicle-mounted terminal 101, the smartphone 102, the smart speaker 103, or the robot 104 in the hardware environment shown in FIG. 1, or certainly may be another type of terminal.

The terminal 100 may include a processor 110, an external memory interface 120, an internal memory 121, a Universal Serial Bus (USB) interface 130, a charging management module 140, a power management module 141, a battery 142, an antenna 1, an antenna 2, a mobile communications module 150, a wireless communications module 160, an audio module 170, a loudspeaker 170A, a telephone receiver 170B, a microphone 170C, a headset jack 170D, a sensor module 180, a key 190, a motor 191, an indicator 192, a camera 193, a display screen 194, a subscriber identity module (SIM) card interface 195, and the like. The sensor module 180 may include a pressure sensor 180A, a gyro sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It can be understood that the structure shown in this embodiment of this disclosure does not constitute a specific limitation on the terminal 100. In some other embodiments of this disclosure, the terminal 100 may include more or fewer components than those shown in the figure, or combine some components, or split some components, or have a different component arrangement. The components shown in the figure may be implemented by hardware, software, or a combination of software and hardware.

The processor 110 may include one or more processing units. For example, the processor 110 may include an application processor (AP), a modem processor, a graphics processing unit (GPU), an image signal processor (ISP), a controller, a video codec, a digital signal processor (DSP), a baseband processor, and/or a neural network processor (NPU). Different processing units may be independent components, or may be integrated into one or more processors.

The controller may generate an operation control signal based on an instruction operation code and a time sequence signal, to complete control of obtaining and executing an instruction.

A memory may be further disposed in the processor 110, to store an instruction and data. In some embodiments, the memory in the processor 110 is a cache. The memory may store an instruction or data that is just used or cyclically used by the processor 110. If the processor 110 needs to use the instruction or data again, the processor 110 may directly invoke the instruction or data from the memory. This avoids repeated access, and reduces a waiting time of the processor 110, thereby improving system efficiency.

In some embodiments, the processor 110 may include one or more interfaces. The interface may include an Inter-Integrated Circuit (I2C) interface, an I2C Sound (I2S) interface, a pulse-code modulation (PCM) interface, a universal asynchronous receiver/transmitter (UART) interface, a Mobile Industry Processor Interface (MIPI), a general-purpose input/output (GPIO) interface, a SIM interface, a USB interface, and/or the like.

The I2C interface is a bidirectional synchronous serial bus, and includes a serial data line (SDL) and a serial clock line (SCL). In some embodiments, the processor 110 may include a plurality of groups of I2C buses. The processor 110 may be separately coupled to the touch sensor 180K, a charger, a flash, the camera 193, and the like through different I2C bus interfaces. For example, the processor 110 may be coupled to the touch sensor 180K through an I2C interface, so that the processor 110 communicates with the touch sensor 180K through the I2C bus interface, to implement a touch function of the terminal 100.

The I2S interface may be used for audio communication. In some embodiments, the processor 110 may include a plurality of groups of I2S buses. The processor 110 may be coupled to the audio module 170 by using an I2S bus, to implement communication between the processor 110 and the audio module 170. In some embodiments, the audio module 170 may transfer an audio signal to the wireless communications module 160 through the I2S interface, to implement a function of answering a call by using a Bluetooth headset.

The PCM interface may also be used for audio communication to sample, quantize, and encode an analog signal. In some embodiments, the audio module 170 and the wireless communications module 160 may be coupled through the PCM bus interface. In some embodiments, the audio module 170 may alternatively transfer an audio signal to the wireless communications module 160 through the PCM interface, to implement a function of answering a call by using a Bluetooth headset. Both the I2S interface and the PCM interface may be used for audio communication.

The UART interface is a universal serial data bus, and is used for asynchronous communication. The bus may be a bidirectional communications bus, and switches to-be-transmitted data between serial communication and parallel communication. In some embodiments, the UART interface is usually configured to connect the processor 110 and the wireless communications module 160. For example, the processor 110 communicates with a Bluetooth module in the wireless communications module 160 through the UART interface, to implement a Bluetooth function. In some embodiments, the audio module 170 may transfer an audio signal to the wireless communications module 160 through the UART interface, to implement a function of playing music by using a Bluetooth headset.

The MIPI interface may be configured to connect the processor 110 and a peripheral component such as the display screen 194 or the camera 193. The MIPI interface includes a camera serial interface (CSI), a display serial interface (DSI), or the like. In some embodiments, the processor 110 and the camera 193 communicate through the CSI interface, to implement a photographing function of the terminal 100. The processor 110 and the display screen 194 communicate through the DSI interface, to implement a display function of the terminal 100.

The GPIO interface may be configured by using software. The GPIO interface may be configured as a control signal, or may be configured as a data signal. In some embodiments, the GPIO interface may be configured to connect the processor 110 to the camera 193, the display screen 194, the wireless communications module 160, the audio module 170, the sensor module 180, and the like. The GPIO interface may be alternatively configured as an I2C interface, an I2S interface, a UART interface, an MIPI interface, or the like.

The USB interface 130 is an interface conforming to a USB standard specification, and may be a mini USB interface, a micro USB interface, a USB type C interface, or the like. The USB interface 130 may be configured to connect to a charger to charge the terminal 100, and may also be used for data transmission between the terminal 100 and a peripheral device. The USB interface 130 may also be configured to connect to a headset, to play audio by using the headset. The interface may be further configured to connect to another terminal, for example, an AR device.

It can be understood that an interface connection relationship, between the modules, shown in this embodiment of this disclosure is merely an example for description, and does not constitute a limitation on a structure of the terminal 100. In some other embodiments of this disclosure, the terminal 100 may alternatively use an interface connection manner different from that in this embodiment, or a combination of a plurality of interface connection manners.

The charging management module 140 is configured to receive a charging input from a charger. The charger may be a wireless charger, or may be a wired charger. In some embodiments of wired charging, the charging management module 140 may receive a charging input from the wired charger through the USB interface 130. In some embodiments of wireless charging, the charging management module 140 may receive a wireless charging input by using a wireless charging coil of the terminal 100. While the charging management module 140 is charging the battery 142, power may be further supplied to the terminal by using the power management module 141.

The power management module 141 is configured to connect the battery 142, the charging management module 140, and the processor 110. The power management module 141 receives an input from the battery 142 and/or the charging management module 140, and supplies power to the processor 110, the internal memory 121, the display screen 194, the camera 193, the wireless communications module 160, and the like. The power management module 141 may be further configured to monitor parameters such as a battery capacity, a quantity of battery cycles, and a battery health status (leakage and impedance). In some other embodiments, the power management module 141 may be alternatively disposed in the processor 110. In some other embodiments, the power management module 141 and the charging management module 140 may be alternatively disposed in a same component.

A wireless communication function of the terminal 100 may be implemented by using the antenna 1, the antenna 2, the mobile communications module 150, the wireless communications module 160, the modem processor, the baseband processor, and the like.

The antenna 1 and the antenna 2 are configured to transmit and receive electromagnetic wave signals. Each antenna in the terminal 100 may be configured to cover one or more communication frequency bands. Different antennas may be further multiplexed, to improve antenna utilization. For example, the antenna 1 may be multiplexed as a diversity antenna of a wireless local area network. In some other embodiments, the antenna may be used in combination with a tuning switch.

The mobile communications module 150 may provide a solution, applied to the terminal 100, for wireless communication including 2G, 3G, 4G, 5G, and the like. The mobile communications module 150 may include at least one filter, a switch, a power amplifier, a low noise amplifier (LNA), and the like. The mobile communications module 150 may receive an electromagnetic wave by using the antenna 1, perform processing such as filtering and amplification on the received electromagnetic wave, and transmit the processed electromagnetic wave to the modem processor for demodulation. The mobile communications module 150 may further amplify a signal modulated by the modem processor, and the amplified signal is converted into an electromagnetic wave for radiation by using the antenna 1. In some embodiments, at least some of function modules of the mobile communications module 150 may be disposed in the processor 110. In some embodiments, at least some of function modules of the mobile communications module 150 may be disposed in a same component as at least some of modules of the processor 110.

The modem processor may include a modulator and a demodulator. The modulator is configured to modulate a to-be-sent low-frequency baseband signal into a medium/high-frequency signal. The demodulator is configured to demodulate a received electromagnetic wave signal into a low-frequency baseband signal. Then, the demodulator transfers, to the baseband processor for processing, the low-frequency baseband signal obtained through demodulation. The low-frequency baseband signal is transferred to the application processor after being processed by the baseband processor. The application processor outputs a sound signal by using an audio device (not limited to the loudspeaker 170A, the telephone receiver 170B, and the like), or displays an image or a video by using the display screen 194. In some embodiments, the modem processor may be an independent component. In some other embodiments, the modem processor may be independent of the processor 110, and be disposed in a same component as the mobile communications module 150 or another function module.

The wireless communications module 160 may provide solutions, applied to the terminal 100, for wireless communication implemented by using approaches including a wireless local area network (WLAN) (for example, a WI-FI network), BLUETOOTH (BT), a global navigation satellite system (GNSS), frequency modulation (FM), a near-field communication (NFC) technology, and an infrared (IR) technology. The wireless communications module 160 may be one or more components integrating at least one communications processor module. The wireless communications module 160 receives an electromagnetic wave by using the antenna 2, performs frequency modulation and filtering processing on an electromagnetic wave signal, and sends the processed signal to the processor 110. The wireless communications module 160 may further receive a to-be-sent signal from the processor 110, perform frequency modulation and amplification on the signal, and convert the frequency-modulated and amplified signal into an electromagnetic wave for radiation by using the antenna 2.

In some embodiments, the antenna 1 and the mobile communications module 150 of the terminal 100 are coupled, and the antenna 2 and the wireless communications module 160 are coupled, so that the terminal 100 can communicate with a network and another device by using a wireless communications technology. The wireless communications technology may include, for example, a Global System for Mobile Communications (GSM), a General Packet Radio Service (GPRS), code-division multiple access (CDMA), wideband CDMA (WCDMA), time-division synchronous CDMA (TD-SCDMA), Long-Term Evolution (LTE), BT, a GNSS, a WLAN, NFC, FM, and/or an IR technology. The GNSS may include a Global Positioning System (GPS), a global navigation satellite system (GLONASS), a BEIDOU navigation satellite system (BDS), a quasi-zenith satellite system (QZSS), and/or a satellite based augmentation system (SBAS).

The terminal 100 implements the display function by using the GPU, the display screen 194, the application processor, and the like. The GPU is a microprocessor for image processing, and is connected to the display screen 194 and the application processor. The GPU is configured to perform mathematical and geometric calculation, and is used for graphics rendering. The processor 110 may include one or more GPUs that execute a program instruction to generate or change display information.

The display screen 194 is configured to display an image, a video, and the like. The display screen 194 includes a display panel. The display panel may use a liquid-crystal display (LCD), an organic light-emitting diode (LED) (OLED), an active-matrix OLED (AMOLED), a flex LED (FLED), a mini LED, a micro LED, a micro-OLED, a quantum dot LED (QLED), or the like. In some embodiments, the terminal 100 may include one or N display screens 194, where N is a positive integer greater than 1.

The terminal 100 may implement the photographing function by using the ISP, the camera 193, the video codec, the GPU, the display screen 194, the application processor, and the like.

The ISP is configured to process data fed back by the camera 193. For example, during photographing, a shutter is opened, light is transferred to a photosensitive element of the camera through a lens, an optical signal is converted into an electrical signal, and the photosensitive element of the camera transfers the electrical signal to the ISP for processing, so that the electrical signal is converted into an image visible to a naked eye. The ISP may further perform algorithm optimization on an image noise, luminance, and complexion. The ISP may further optimize parameters such as an exposure and a color temperature of a photographing scenario. In some embodiments, the ISP may be disposed in the camera 193.

The camera 193 is configured to capture a static image or a video. An optical image is generated for an object by using the lens and is projected onto the photosensitive element. The photosensitive element may be a charge-coupled device (CCD) or a complementary metal-oxide-semiconductor (CMOS) phototransistor. The photosensitive element converts an optical signal into an electrical signal, and then transfers the electrical signal to the ISP, to convert the electrical signal into a digital image signal. The ISP outputs the digital image signal to the DSP for processing. The DSP converts the digital image signal into an image signal in a standard format such as red, green, and blue (RGB) or luma, red projection, and blue projection (YUV). In some embodiments, the terminal 100 may include one or N cameras 193, where N is a positive integer greater than 1.

The digital signal processor is configured to process a digital signal, and may further process another digital signal in addition to a digital image signal. For example, when the terminal 100 performs frequency channel selection, the digital signal processor is configured to perform Fourier transformation and the like on frequency channel energy.

The video codec is configured to compress or decompress a digital video. The terminal 100 may support one or more types of video codecs. In this way, the terminal 100 can play or record videos in a plurality of encoding formats, for example, the MPEG-1, MPEG-2, MPEG-3, and MPEG-4.

The NPU is a neural-network (NN) computing processor, and quickly processes input information by learning from a biological neural network structure, for example, by learning from a mode of transfer between human-brain neurons, and may further perform self-learning constantly. The NPU may be used for implementing applications such as intelligent cognition of the terminal 100, for example, image recognition, facial recognition, speech recognition, and text understanding.

The external memory interface 120 may be configured to connect to an external memory card, for example, a micro Secure Digital (SD) card, to extend a storage capacity of the terminal 100. The external memory card communicates with the processor 110 through the external memory interface 120, to implement a data storage function, for example, store a file such as a music file or a video file in the external memory card.

The internal memory 121 may be configured to store computer executable program code, and the executable program code includes an instruction. The internal memory 121 may include a program storage area and a data storage area. In addition, the internal memory 121 may store the prediction model described in the foregoing method embodiments. The program storage area may store an operating system, an application program required by at least one function (for example, a sound playback function and an image playback function), and the like. The data storage area may store data (such as audio data and a phone book) created during use of the terminal 100, or the like. In addition, the internal memory 121 may include a high-speed RAM, and may further include a non-volatile memory, for example, at least one magnetic disk storage device, a flash memory device, or a universal flash storage (UFS). The processor 110 executes various function applications and data processing of the terminal 100 by running the instruction stored in the internal memory 121 and/or the instruction stored in the memory disposed in the processor.

The terminal 100 may use the audio module 170, the loudspeaker 170A, the telephone receiver 170B, the microphone 170C, the headset jack 170D, the application processor, and the like to implement an audio function, for example, music playback and sound recording.

The audio module 170 is configured to convert digital audio information into an analog audio signal for output, and is also configured to convert an analog audio input into a digital audio signal. The audio module 170 may be further configured to encode and decode audio signals. In some embodiments, the audio module 170 may be disposed in the processor 110, or some of function modules of the audio module 170 are disposed in the processor 110.

The loudspeaker 170A, also referred to as a "speaker", is configured to convert an audio electrical signal into a sound signal. The terminal 100 may be used for listening to music or listening to a hands-free call by using the loudspeaker 170A.

The telephone receiver 170B, also referred to as a "phone receiver", is configured to convert an audio electrical signal into a sound signal. When a call is being answered or a voice message is being listened to by using the terminal 100, the telephone receiver 170B may be placed close to a human ear to listen to speech.

The microphone 170C is configured to convert a sound signal into an electrical signal. When making a call or sending a voice message, a user may utter a sound with the mouth close to the microphone 170C, to input a sound signal into the microphone 170C. The terminal 100 may have at least one microphone 170C. In some other embodiments, the terminal 100 may have two microphones 170C, to collect a sound signal and further implement a noise reduction function. In some other embodiments, the terminal 100 may alternatively have three, four, or more microphones 170C, to collect a sound signal, reduce noise, identify a sound source, implement a directional recording function, and the like.

The headset jack 170D is configured to connect to a wired headset. The headset jack 170D may be the USB interface 130, or may be a 3.5 millimeters (mm) Open Mobile Terminal Platform (OMTP) standard interface or a Cellular Telecommunications Industry Association (CTIA) of the United States of America (USA) standard interface.

The pressure sensor 180A is configured to sense a pressure signal, and can convert the pressure signal into an electrical signal. In some embodiments, the pressure sensor 180A may be disposed in the display screen 194. There are many types of pressure sensors 180A, for example, a resistive pressure sensor, an inductive pressure sensor, and a capacitive pressure sensor. The capacitive pressure sensor may include at least two parallel plates with conductive materials. When a force is applied to the pressure sensor 180A, capacitance between electrodes changes. The terminal 100 determines pressure intensity based on a capacitance change. When a touch operation is performed on the display screen 194, the terminal 100 detects strength of the touch operation by using the pressure sensor 180A. The terminal 100 may also calculate a touch position based on a detection signal of the pressure sensor 180A. In some embodiments, touch operations that are performed on a same touch position but have different touch operation strength may correspond to different operation instructions. For example, when a touch operation whose touch operation strength is less than a first pressure threshold is performed on a Short Message Service (SMS) message application icon, an instruction for viewing an SMS message is executed, when a touch operation whose touch operation strength is greater than or equal to the first pressure threshold is performed on the SMS message application icon, an instruction for creating a new SMS message is executed.

The gyro sensor 180B may be configured to determine a motion posture of the terminal 100. In some embodiments, an angular velocity of the terminal 100 around three axes (namely, x, y, and z axes) may be determined by using the gyro sensor 180B. The gyro sensor 180B may be used for image stabilization during photographing. For example, when a shutter is pressed, the gyro sensor 180B detects a shaking angle of the terminal 100, calculates, based on the angle, a distance that a lens module needs to compensate, and allows the lens to cancel shaking of the terminal 100 through reverse motion, to implement image stabilization. The gyro sensor 180B may also be used for navigation and a motion sensing game scenario.

The barometric pressure sensor 180C is configured to measure barometric pressure. In some embodiments, the terminal 100 calculates an altitude by using a barometric pressure value obtained through measurement by the barometric pressure sensor 180C, to assist in positioning and navigation.

The magnetic sensor 180D includes a Hall effect sensor. The terminal 100 may detect opening and closing of a flip carrying case by using the magnetic sensor 180D. In some embodiments, when the terminal 100 is a flip phone, the terminal 100 may detect opening and closing of a flip cover by using the magnetic sensor 180D. Further, a feature such as flip auto unlocking is set based on a detected open or closed state of the carrying case or a detected open or closed state of the flip cover.

The acceleration sensor 180E may detect magnitudes of accelerations of the terminal 100 in various directions (generally on three axes), may detect a magnitude and direction of gravity when the terminal 100 is static, and may be further configured to identify a posture of the terminal, and be applied to an application such as switching between landscape orientation and portrait orientation or a pedometer.

The distance sensor 180F is configured to measure a distance. The terminal 100 may measure a distance by using infrared or laser. In some embodiments, in a photographing scenario, the terminal 100 may measure a distance by using the distance sensor 180F, to implement fast focusing.

The optical proximity sensor 180G may include, for example, an LED and an optical detector, such as a photodiode. The LED may be an infrared emitting diode. The terminal 100 emits infrared light by using the LED. The terminal 100 uses the photodiode to detect reflected infrared light from a nearby object. When sufficient reflected light is detected, it may be determined that there is an object near the terminal 100. When insufficient reflected light is detected, the terminal 100 may determine that there is no object near the terminal 100. The terminal 100 may detect, by using the optical proximity sensor 180G, that the user holds the terminal 100 close to an ear to make or answer a call, and therefore automatically turn off the screen to save power. The optical proximity sensor 180G may also be used for carrying-case-mode or pocket-mode auto unlocking and screen locking.

The ambient light sensor 180L is configured to sense ambient light intensity. The terminal 100 may adaptively adjust brightness of the display screen 194 based on the sensed ambient light intensity. The ambient light sensor 180L may also be configured to automatically adjust white balance during photographing. The ambient light sensor 180L may further cooperate with the optical proximity sensor 180G in detecting whether the terminal 100 is in a pocket, to prevent an accidental touch.

The fingerprint sensor 180H is configured to collect a fingerprint. The terminal 100 may use a collected fingerprint feature to implement fingerprint unlock, application access lock, fingerprint photographing, fingerprint call answering, and the like.

The temperature sensor 180J is configured to detect a temperature. In some embodiments, the terminal 100 executes a temperature processing policy based on a temperature detected by the temperature sensor 180J. For example, when a temperature reported by the temperature sensor 180J exceeds a threshold, the terminal 100 lowers performance of a processor close to the temperature sensor 180J, to reduce power consumption and implement thermal protection. In some other embodiments, when a temperature is less than another threshold, the terminal 100 heats the battery 142 to prevent abnormal shutdown of the terminal 100 caused by the low temperature. In some other embodiments, when a temperature is less than still another threshold, the terminal 100 boosts an output voltage of the battery 142 to prevent abnormal shutdown caused by the low temperature.

The touch sensor 180K is also referred to as a "touch control device". The touch sensor 180K may be disposed in the display screen 194, and the touch sensor 180K and the display screen 194 constitute a touchscreen, also referred to as a "touch control screen". The touch sensor 180K is configured to detect a touch operation on or near the touchscreen. The touch sensor may transfer the detected touch operation to the application processor to determine a touch event type. A visual output related to the touch operation may be provided by using the display screen 194. In some other embodiments, the touch sensor 180K may be alternatively disposed on a surface of the terminal 100, in a position different from that of the display screen 194.

The bone conduction sensor 180M may obtain a vibration signal. In some embodiments, the bone conduction sensor 180M may obtain a vibration signal of a human vocal-part vibration bone. The bone conduction sensor 180M may also contact a body pulse to receive a blood pressure beating signal. In some embodiments, the bone conduction sensor 180M may be alternatively disposed in a headset, to be combined with the headset into a bone conduction headset. The audio module 170 may obtain a voice instruction through parsing based on the vibration signal, of the vocal-part vibration bone, obtained by the bone conduction sensor 180M, so as to implement a voice function. The application processor may parse heart rate information based on the blood pressure beating signal obtained by the bone conduction sensor 180M, so as to implement a heart rate detection function.

The key 190 includes a power key, a volume key, and the like. The key 190 may be a mechanical key, or may be a touch key. The terminal 100 may receive a key input, and generate a key signal input related to user setting and function control of the terminal 100.

The motor 191 may generate a vibration prompt. The motor 191 may be used for an incoming call vibration prompt, and may also be used for a touch vibration feedback. For example, touch operations performed on different applications (such as photographing and audio playback) may correspond to different vibration feedback effects. For touch operations performed on different areas of the display screen 194, the motor 191 may also correspond to different vibration feedback effects. Different application scenarios (for example, a time reminder, information reception, an alarm clock, and a game) may also correspond to different vibration feedback effects. A touch vibration feedback effect can also be user-defined.

The indicator 192 may be an indicator light, and may be configured to indicate a charging status and a battery level change, or may be configured to indicate a message, a missed call, a notification, and the like.

The SIM card interface 195 is configured to connect to a SIM card. The SIM card may be inserted into the SIM card interface 195 or removed from the SIM card interface 195, to come into contact with or be separated from the terminal 100. The terminal 100 may support one or N SIM interfaces, where N is a positive integer greater than 1. The SIM card interface 195 may support a nano-SIM card, a micro-SIM card, a SIM card, and the like. A plurality of cards may be inserted into the same SIM card interface 195 at the same time. The plurality of cards may be of a same type or different types. The SIM card interface 195 may also be compatible with different types of SIM cards. The SIM card interface 195 may also be compatible with an external memory card. The terminal 100 interacts with a network by using a SIM card, to implement functions such as calling and data communication. In some embodiments, the terminal 100 uses an eSIM, namely, an embedded SIM card. The eSIM card may be embedded in the terminal 100, and cannot be separated from the terminal 100. A software system of the terminal 100 may use a layered architecture, an event driven architecture, a microkernel architecture, a microservice architecture, or a cloud architecture.

An ANDROID system with a layered architecture is used as an example to describe a software structure of the terminal 100.

Figure 16:
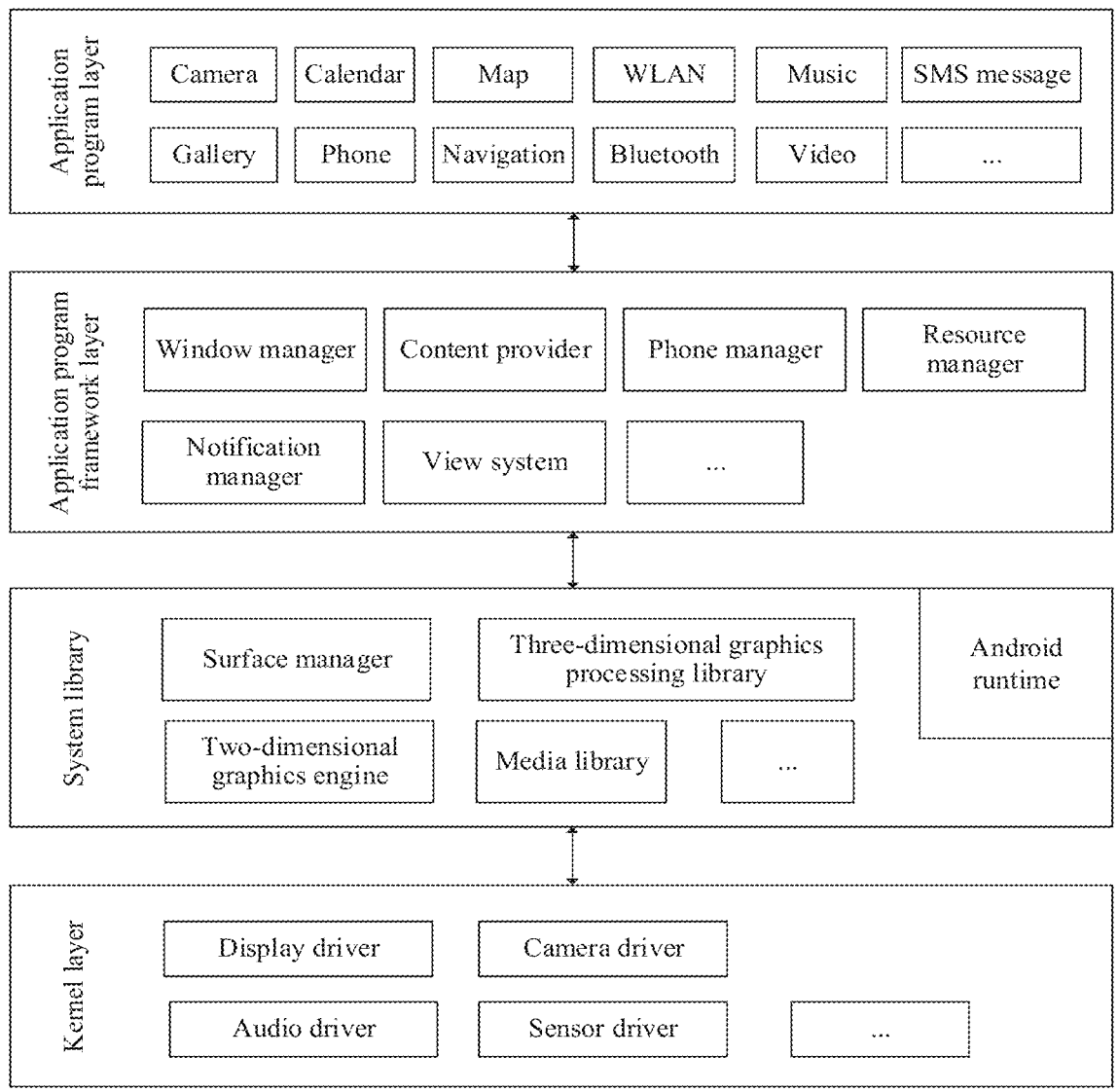
FIG. 16 is a functional architectural diagram of a terminal according to an embodiment of this disclosure.

FIG. 16 is a function architectural diagram of a terminal 100 according to an embodiment of this disclosure.

A layered architecture divides software into layers, and each layer has a clear role and responsibility. Layers communicate with each other through a software interface. In some embodiments, an ANDROID system is divided into four layers. From top to bottom, the four layers are: an application program layer, an application program framework layer, ANDROID runtime and a system library, and a kernel layer.

The application program layer may include a series of application program packages.

As shown in FIG. 16, the application program packages may include application programs such as camera, gallery, calendar, phone, maps, navigation, WLAN, BT, music, videos, and SMS messages.

The application program framework layer provides an application programming interface (API) and a programming framework for the application programs at the application program layer. The application program framework layer includes some predefined functions.

As shown in FIG. 16, the application program framework layer may include a window manager, a content provider, a view system, a phone manager, a resource manager, a notification manager, and the like.

The window manager is configured to manage a window program. The window manager may obtain a display screen size, determine whether there is a status bar, lock a screen, capture the screen, and the like.

The content provider is configured to store and obtain data, and make the data accessible to an application program. The data may include a video, an image, audio, calls made and answered, browse history and favorites, a phone book, and the like.

The view system includes visual controls, such as a control for text display and a control for picture display. The view system may be used to construct an application program. A display interface may include one or more views. For example, a display interface including an SMS notification icon may include a text display view and a picture display view.

The phone manager is configured to provide a communication function of the terminal 100, for example, call status management (including call connection, call cutoff, and the like).

The resource manager provides, for an application program, various resources such as a localized character string, an icon, a picture, a layout file, and a video file.

The notification manager enables an application program to display notification information in a status bar, and may be used to convey a notification-type message. The displayed information may automatically disappear after a short stay, without user interaction. For example, the notification manager is configured to indicate that downloading is completed, provide a message notification, and the like. The notification manager may alternatively provide a notification, such as a notification of an application program that runs in the background, appearing in a form of a chart or scroll bar text in a status bar at a system top, or may provide a notification appearing in a form of a dialog window on the screen. For example, text information is displayed in the status bar, an alert tone is played, the terminal vibrates, or an indicator blinks.

ANDROID runtime includes a kernel library and a virtual machine. ANDROID runtime is responsible for ANDROID system scheduling and management.

The kernel library includes two parts: a functional function that needs to be invoked by a Java language, and an ANDROID kernel library.

The application program layer and the application program framework layer run in the virtual machine. The virtual machine executes java files at the application program layer and the application program framework layer as binary files. The virtual machine is configured to perform functions such as object life cycle management, stack management, thread management, security and exception management, and garbage collection.

The system library may include a plurality of function modules, for example, a surface manager, a media library, a three-dimensional (3D) graphics processing library (for example, OpenGL Embedded System (ES)), and a two-dimensional (2D) graphics engine (for example, SGL).

The surface manager is configured to manage a display subsystem, and provides blending of 2D and 3D layers for a plurality of application programs.

The media library supports playback and recording of a plurality of common audio and video formats, a static image file, and the like. The media library may support a plurality of audio and video encoding formats, for example, MPEG-4, H.264, MP3, Advanced Audio Coding (AAC), Adaptive Multi-Rate (AMR), Joint Photographic Experts Group (JPEG), and Portable Network Graphics (PNG).

The three-dimensional graphics processing library is used to implement three-dimensional graphics drawing, image rendering, synthesis, layer processing, and the like.

The 2D graphics engine is a drawing engine for 2D drawing.

The kernel layer is a layer between hardware and software. The kernel layer includes at least a display driver, a camera driver, an audio driver, and a sensor driver.

The following describes, by using an example, a working procedure of the software and hardware of the terminal 100 with reference to a speech detection scenario.

The terminal 100 starts the microphone 170C by using the audio driver, collects an audio signal by using the microphone 170C, starts the camera driver, and photographs a face image by using the camera 193. The terminal loads a prediction model to the internal memory 121, and the processor 110 inputs the face image into the prediction model. The processor 110 processes the face image by using the prediction model, and outputs a prediction result. If the prediction result indicates that a user does not intend to continue speaking, the processor 110 determines that the audio signal is a speech end point.

In some possible embodiments, the electronic device performing the embodiment in FIG. 2, the embodiment in FIG. 6, or the embodiment in FIG. 10A and FIG. 10B may be implemented as a computing device, and the computing device may be a server, a host, a personal computer, or the like. The computing device may be implemented by using a general bus architecture.

Figure 17:
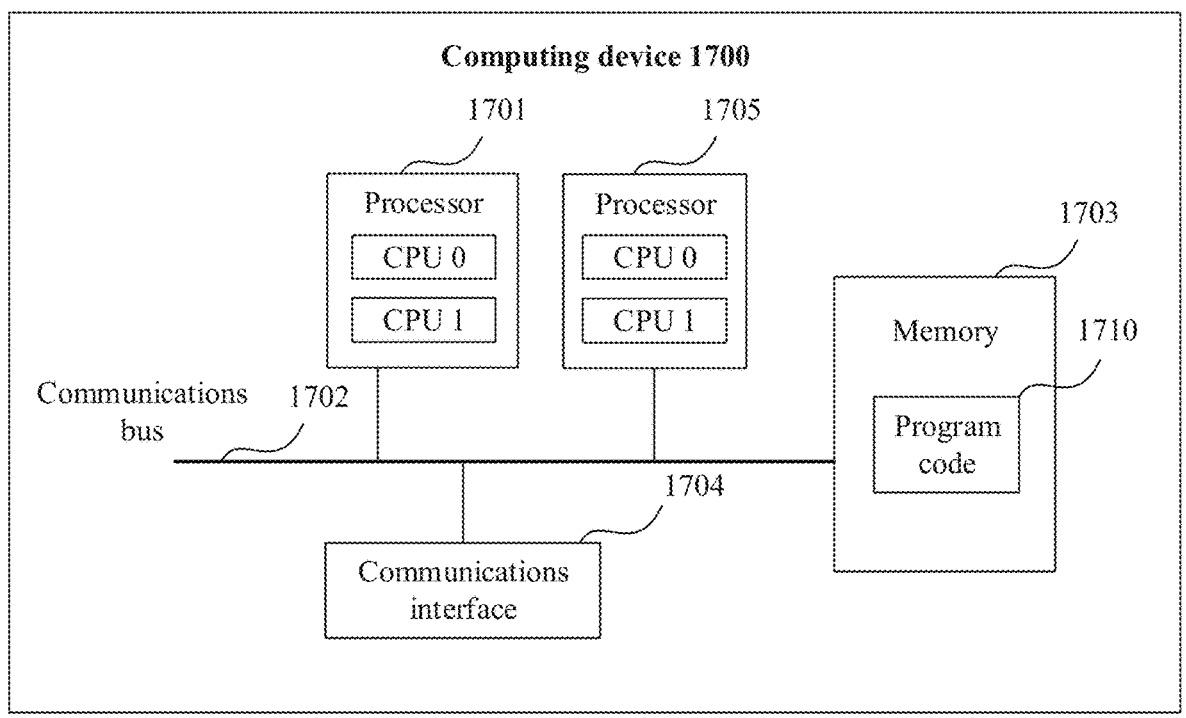
FIG. 17 is a schematic structural diagram of a computing device according to an embodiment of this disclosure.

FIG. 17 is a schematic structural diagram of a computing device according to an embodiment of this disclosure. The computing device may be configured as the electronic device in the foregoing method embodiments.

The computing device may be any device in all or part of the content described in the method embodiments. The computing device includes at least one processor 1701, a communications bus 1702, a memory 1703, and at least one communications interface 1704.

The processor 1701 may be a general-purpose CPU, an NP, or a microprocessor, or may be one or more integrated circuits configured to implement the solutions in this disclosure, for example, an ASIC, a PLD, or a combination thereof. The PLD may be a CPLD, an FPGA, a GAL, or any combination thereof.

The communications bus 1702 is configured to transfer information between the foregoing components. The communications bus 1702 may be classified into an address bus, a data bus, a control bus, and the like. For ease of representation, only one thick line is used to represent the bus in the figure, but this does not mean that there is only one bus or only one type of bus.

The memory 1703 may be a ROM or another type of static storage device that can store static information and an instruction, or may be a RAM or another type of dynamic storage device that can store information and an instruction, or may be an EEPROM, a CD-ROM or another CD storage, an optical disc storage (including a compact optical disc, a laser disc, an optical disc, a DVD, a BLU-RAY disc, and the like), a magnetic disk storage medium or another magnetic storage device, or any other medium that can be used to carry or store expected program code in a form of an instruction or a data structure and that can be accessed by a computer. However, the memory is not limited thereto. The memory 1703 may exist independently, and be connected to the processor 1701 by using the communications bus 1702. Alternatively, the memory 1703 may be integrated with the processor 1701.

The communications interface 1704 uses any apparatus of a transceiver type, and is configured to communicate with another device or a communications network. The communications interface 1704 includes a wired communications interface, and may further include a wireless communications interface. The wired communications interface may be, for example, an Ethernet interface. The Ethernet interface may be an optical interface, an electrical interface, or a combination thereof. The wireless communications interface may be a WLAN interface, a cellular network communications interface, a combination thereof, or the like.

In an embodiment, the processor 1701 may include one or more CPUs, for example, a CPU 0 and a CPU 1 shown in FIG. 3.

In an embodiment, the computer device may include a plurality of processors, for example, the processor 1701 and a processor 1705 shown in FIG. 3. Each of the processors may be a single-core (single-CPU) processor, or may be a multi-core (multi-CPU) processor. The processor herein may be one or more devices, circuits, and/or processing cores configured to process data (for example, a computer program instruction).

In an embodiment, the computer device may further include an output device 1706 and an input device 1707. The output device 1706 communicates with the processor 1701, and may display information in a plurality of manners. For example, the output device 1706 may be an LCD, an LED display device, a cathode-ray tube (CRT) display device, or a projector. The input device 1707 communicates with the processor 1701, and may receive a user input in a plurality of manners. For example, the input device 1707 may be a mouse, a keyboard, a touchscreen device, or a sensing device.

In some embodiments, the memory 1703 is configured to store program code 1710 for executing the solutions in this disclosure, and the processor 1701 may execute the program code 1710 stored in the memory 1703. In other words, the computing device may implement, by using the processor 1701 and the program code 1710 in the memory 1703, the method provided in the method embodiments.

The computing device in this embodiment of may correspond to the electronic device in the foregoing method embodiments, and the processor 1710, the transceiver 1720, and the like in the computing device may implement functions of and/or various steps and methods performed by the electronic device in the foregoing method embodiments. For brevity, details are not described herein again.

In some possible embodiments, the electronic device performing the embodiment in FIG. 2, the embodiment in FIG. 6, or the embodiment in FIG. 10A and FIG. 10B may be alternatively implemented by a general purpose processor. For example, a form of the general purpose processor may be a chip. Further, the general purpose processor implementing the electronic device includes a processing circuit, and an input interface and output interface for connection to and communication with an inside of the processing circuit. The input interface may input an audio signal and a face image into the processing circuit. The processing circuit is configured to perform step 602 to step 608. The processing circuit may output a speech detection result through the output interface. Optionally, the general purpose processor may further include a storage medium. The storage medium may store an instruction executed by the processing circuit. The processing circuit is configured to execute the instruction stored in the storage medium, to perform the foregoing method embodiments. Optionally, the storage medium may be further configured to buffer a prediction model, or persistently store a prediction model.

In a possible product form, the electronic device performing the embodiment in FIG. 2, the embodiment in FIG. 6, or the embodiment in FIG. 10A and FIG. 10B may be alternatively implemented by using the following: one or more FPGAs, a PLD, a controller, a state machine, a gate logic, a discrete hardware component, any other suitable circuit, or any combination of circuits that can perform various functions described in this entire application.

In some possible embodiments, the electronic device performing the embodiment in FIG. 2, the embodiment in FIG. 6, or the embodiment in FIG. 10A and FIG. 10B may be alternatively implemented by using a computer program product. Further, an embodiment of this disclosure provides a computer program product. When the computer program product is run on an electronic device, the electronic device is enabled to perform the speech detection method in the foregoing method embodiments.

It should be understood that the foregoing various product forms of electronic devices, such as the terminal 100 and the computing device 1600, each have any function of the electronic device in the method embodiment in FIG. 2, the embodiment in FIG. 6, or the embodiment in FIG. 10A and FIG. 10B. Details are not described herein again.

A person of ordinary skill in the art may be aware that method steps and units described with reference to the embodiments disclosed in this specification can be implemented by electronic hardware, computer software, or a combination thereof. To clearly describe interchangeability between the hardware and the software, the foregoing generally describes steps and composition of each embodiment based on functions. Whether the functions are performed by the hardware or the software depends on particular applications and design constraints of the technical solutions. For each particular application, a person of ordinary skill in the art may use different methods to implement the described functions, but it should not be considered that the implementation goes beyond the scope of this disclosure.

It can be clearly understood by a person skilled in the art that, for the purpose of convenient and brief description, for detailed working processes of the foregoing described system, apparatus, and unit, refer to corresponding processes in the foregoing method embodiments, and details are not described herein again.

In the several embodiments provided in this disclosure, it should be understood that the disclosed system, apparatus, and method may be implemented in other manners. For example, the described apparatus embodiment is merely an example. For example, the division into units is merely logical function division, and may be another division during actual implementation. For example, a plurality of units or components may be combined, or may be integrated into another system, or some features may be ignored or not performed. In addition, the displayed or discussed mutual couplings or direct couplings or communications connections may be implemented through some interfaces, or indirect couplings or communications connections between the apparatuses or units, or may be implemented in electrical, mechanical, or another form.

The units described as separate parts may or may not be physically separate, and parts displayed as units may or may not be physical units, and may be placed on one location, or may be distributed on a plurality of network units. Some or all of the units may be selected based on an actual requirement to achieve the objectives of the solutions in the embodiments of this disclosure.

In addition, function units in the embodiments of this disclosure may be integrated into one processing unit, or each unit may exist independently physically, or two or more units may be integrated into one unit. The integrated unit may be implemented in a form of hardware, or may be implemented in a form of a software function unit.

When the integrated unit is implemented in the form of the software function unit and sold or used as an independent product, the integrated unit may be stored in a computer-readable storage medium. Based on such an understanding, the technical solutions of this disclosure essentially, or the part contributing to the conventional technology, or all or some of the technical solutions may be implemented in a form of a software product. The computer software product is stored in a storage medium and includes several instructions for instructing a computer device (which may be a personal computer, a server, a network device, or the like) to perform all or some of the steps of the method described in the embodiments of this disclosure. The foregoing storage medium includes any medium that can store program code, such as a USB flash drive, a removable hard disk, a ROM, a RAM, a magnetic disk, or an optical disc.

The foregoing descriptions are merely specific implementations of this disclosure, but are not intended to limit the protection scope of this disclosure. Any equivalent modification or replacement readily figured out by a person skilled in the art within the technical scope disclosed in this disclosure shall fall within the protection scope of this disclosure. Therefore, the protection scope of this disclosure shall be subject to the protection scope of the claims.

All or some of the foregoing embodiments may be implemented by using software, hardware, firmware, or any combination thereof. When the software is used for implementation, all or some of the embodiments may be implemented in a form of a computer program product. The computer program product includes one or more computer program instructions. When the computer program instruction is loaded and executed on a computer, the procedures or functions according to the embodiments of this disclosure are all or partially generated. The computer may be a general-purpose computer, a special-purpose computer, a computer network, or another programmable apparatus. The computer instruction may be stored in a computer-readable storage medium, or may be transmitted from one computer-readable storage medium to another computer-readable storage medium. For example, the computer instruction may be transmitted from a website, computer, server, or data center to another website, computer, server, or data center in a wired or wireless manner. The computer-readable storage medium may be any usable medium that can be accessed by a computer, or may be a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive), or the like.

A person of ordinary skill in the art may understand that all or some of the steps of the embodiments may be implemented by hardware, or may be implemented by a program instructing related hardware. The program may be stored in a computer-readable storage medium. The storage medium may be a read-only memory, a magnetic disk, an optical disc, or the like.

The foregoing descriptions are merely optional embodiments of this disclosure, but are not intended to limit this disclosure. Any modification, equivalent replacement, improvement, or the like made without departing from the spirit and principle of this disclosure shall fall within the protection scope of this disclosure.

What is claimed is:

1. A method comprising:
   obtaining an audio signal and a face image, wherein a first photographing time point of the face image is the same as a first collection time point of the audio signal;
   inputting the face image into a prediction model to predict whether a user intends to continue speaking;
   processing the face image using the prediction model to obtain a prediction result;
   outputting the prediction result; and
   determining that the audio signal is a speech end point when the prediction result indicates that the user does not intend to continue speaking.

2. The method of claim 1, wherein processing the face image comprises:
   extracting a key point from the face image;
   processing the key point to obtain action features of the face image;
   classifying the action features to obtain confidence degrees respectively corresponding to different types; and
   determining the prediction result based on the confidence degrees.

3. The method of claim 1, further comprising obtaining the prediction model through training based on a first sample face image and a second sample face image, wherein the first sample face image is marked with a first label indicating that a sample user intends to continue speaking, wherein the first label is based on a first sample audio signal, wherein a second collection time point of the first sample audio signal and a first collection object of the first sample audio signal are the same as a second photographing time point of the first sample face image and a first photographing object of the first sample face image, wherein the second sample face image is marked with a second label indicating that the sample user does not intend to continue speaking, wherein the second label is based on a second sample audio signal, and wherein a third collection time point of the second sample audio signal and a second collection object of the second sample audio signal are the same as a third photographing time point of the second sample face image and a second photographing object of the second sample face image.

4. The method of claim 3, wherein the first sample audio signal meets a condition, and wherein the condition comprises at least one of:
   a voice activity detection (VAD) result corresponding to the first sample audio signal is firstly updated from a speaking state to a silent state, and secondly updated from the silent state to the speaking state;
   a trailing silence duration of the first sample audio signal is less than a first threshold and greater than a second threshold, wherein the first threshold is greater than the second threshold;
   a first confidence degree of a text information combination is greater than a second confidence degree of first text information, wherein the text information combination is of the first text information and second text information, wherein the first text information indicates first semantics of a previous sample audio signal of the first sample audio signal, wherein the second text information indicates second semantics of a next sample audio signal of the first sample audio signal, wherein the first confidence degree indicates a first probability that the text information combination is a first complete statement, and wherein the second confidence degree indicates a second probability that the first text information is a second complete statement; or the first confidence degree is greater than a third confidence degree of the second text information, wherein the third confidence degree indicates a third probability that the second text information is a third complete statement.

5. The method of claim 3, wherein the second sample audio signal meets a condition, and wherein the condition comprises a voice activity detection (VAD) result corresponding to the second sample audio signal is updated from a speaking state to a silent state.

6. The method of claim 3, wherein the first sample face image meets a condition, and wherein the condition comprises:
- inputting the first sample face image into a first classifier in the prediction model, wherein the first classifier is configured to predict a first probability that the first sample face image comprises an action;
- inputting the first sample face image into a second classifier in the prediction model, wherein the second classifier is configured to predict a second probability that the first sample face image does not comprise the action; and
- identifying that the first probability is greater than the second probability.

7. The method of claim 3, wherein the second sample audio signal meets a condition, and wherein the condition comprises a trailing silence duration of the second sample audio signal is greater than a threshold.

8. The method of claim 1, wherein after obtaining the audio signal and the face image, the method further comprises:
- performing speech recognition on the audio signal to obtain text information corresponding to the audio signal;
- performing syntax analysis on the text information to obtain a first analysis result indicating whether the text information is a first complete statement;
- determining that the audio signal is not the speech end point when the first analysis result indicates that the text information is not the first complete statement; and
- inputting the face image into the prediction model when the first analysis result indicates that the text information is the first complete statement.

9. The method according of claim 8, wherein performing syntax analysis comprises:
- performing word segmentation on the text information to obtain a plurality of first words;
- performing, for each of the first words, the syntax analysis on a second word in the first words to obtain a second analysis result corresponding to the second word, wherein the second analysis result indicates whether the second word and a previous word of the second word form a second complete statement;
- determining that the text information is a third complete statement when a third analysis result corresponding to one of the first words indicates that a fourth complete statement is formed; and
- determining that the text information is not the third complete statement when a fourth analysis result corresponding to each of the first words indicates that the fourth complete statement is not formed.

10. A method for training a prediction model for speech detection, wherein the method comprises:
- obtaining a sample audio signal set and a sample face image set;
- processing, based on a first sample audio signal in the sample audio signal set, a third sample face image in the sample face image set, to obtain a first sample face image marked with a first label, wherein the first label indicates that a sample user intends to continue speaking, and wherein a first photographing time point of the first sample face image and a first photographing object of the first sample face image are the same as a first collection time point of the first sample audio signal and a first collection object of the first sample audio signal;
- processing, based on a second sample audio signal in the sample audio signal set, a fourth sample face image in the sample face image set to obtain a second sample face image marked with a second label, wherein the second label indicates that the sample user does not intend to continue speaking, and wherein a second photographing time point of the second sample face image and a second photographing object of the second sample face image are the same as a second collection time point of the second sample audio signal and a second collection object of the second sample audio signal; and
- performing model training using the first sample face image and the second sample face image to obtain the prediction model to predict whether a user intends to continue speaking.

11. The method of claim 10, wherein the first sample audio signal meets a condition, and wherein the condition comprises at least one of:
- a voice activity detection (VAD) result corresponding to the first sample audio signal is firstly updated from a speaking state to a silent state, and secondly updated from the silent state to the speaking state;
- a trailing silence duration of the first sample audio signal is less than a first threshold and greater than a second threshold, wherein the first threshold is greater than the second threshold;
- a first confidence degree of a text information combination is greater than a second confidence degree of first text information, wherein the text information combination is of the first text information and second text information, wherein the first text information indicates first semantics of a previous sample audio signal of the first sample audio signal, wherein the second text information indicates second semantics of a next sample audio signal of the first sample audio signal, wherein the first confidence degree indicates a first probability that the text information combination is a first complete statement, and wherein the second confidence degree indicates a second probability that the first text information is a second complete statement; or
- the first confidence degree is greater than a third confidence degree of the second text information, wherein the third confidence degree indicates a third probability that the second text information is a third complete statement.

12. The method of claim 10, wherein the second sample audio signal meets a condition, and wherein the condition comprises at least one of:
- a voice activity detection (VAD) result corresponding to the second sample audio signal is updated from a speaking state to a silent state; or a trailing silence duration of the second sample audio signal is greater than a threshold.

13. The method according to claim 10, wherein the first sample face image meets a condition, and wherein the condition comprises:
inputting the first sample face image into a first classifier in the prediction model, wherein the first classifier is configured to predict a first probability that the first sample face image comprises an action;
inputting the first sample face image into a second classifier in the prediction model, wherein the second classifier is configured to predict a second probability that the first sample face image does not comprise the action; and
identifying that the first probability is greater than the second probability.

14. An apparatus comprising:
a memory configured to store instructions; and
a processor coupled to the memory, wherein the instructions cause the processor to be configured to:
obtain an audio signal and a face image, wherein a first photographing time point of the face image is the same as a first collection time point of the audio signal;
input the face image into a prediction model to predict whether a user intends to continue speaking;
process the face image using the prediction model to obtain a prediction result;
output the prediction result; and
determine that the audio signal is a speech end point when the prediction result indicates that the user does not intend to continue speaking.

15. The apparatus of claim 14, wherein the instructions further cause the processor to be configured to obtain the prediction model through training based on a first sample face image and a second sample face image, wherein the first sample face image is marked with a first label indicating that a sample user intends to continue speaking, wherein the first label is based on a first sample audio signal, wherein a second collection time point of the first sample audio signal and a first collection object of the first sample audio signal are the same as a second photographing time point of the first sample face image and a first photographing object of the first sample face image, wherein the second sample face image is marked with a second label, indicating that the sample user does not intend to continue speaking, wherein the second label is based on a second sample audio signal, and wherein a third collection time point of the second sample audio signal and a second collection object of the second sample audio signal are the same as a third photographing time point of the second sample face image and a second photographing object of the second sample face image.

16. The apparatus of claim 15, wherein the first sample audio signal meets a condition, and wherein the condition comprises at least one of:
a voice activity detection (VAD) result corresponding to the first sample audio signal is firstly updated from a speaking state to a silent state, and secondly updated from the silent state to the speaking state;
a trailing silence duration of the first sample audio signal is less than a first threshold and greater than a second threshold, wherein the first threshold is greater than the second threshold;
a first confidence degree of a text information combination is greater than a second confidence degree of first text information, wherein the text information combination is of the first text information and second text information, wherein the first text information indicates first semantics of a previous sample audio signal of the first sample audio signal, wherein the second text information indicates second semantics of a next sample audio signal of the first sample audio signal, wherein the first confidence degree indicates a first probability that the text information combination is a first complete statement, and wherein the second confidence degree indicates a second probability that the first text information is a second complete statement; or
the first confidence degree is greater than a third confidence degree of the second text information, wherein the third confidence degree indicates a third probability that the second text information is a third complete statement.

17. The apparatus of claim 15, wherein the second sample audio signal meets a condition, and wherein the condition comprises at least one of:
a voice activity detection (VAD) result corresponding to the second sample audio signal is updated from a speaking state to a silent state; or
a trailing silence duration of the second sample audio signal is greater than a threshold.

18. The apparatus of claim 15, wherein the first sample face image meets a condition, and wherein the condition comprises:
inputting the first sample face image into a first classifier in the prediction model, wherein the first classifier is configured to predict a first probability that the first sample face image comprises an action;
inputting the first sample face image into a second classifier in the prediction model, wherein the second classifier is configured to predict a second probability that the first sample face image does not comprise the action; and
identifying that the first probability is greater than the second probability.

19. The apparatus of claim 14, wherein the instructions further cause the processor to be configured to:
perform speech recognition on the audio signal to obtain text information corresponding to the audio signal;
perform syntax analysis on the text information to obtain a first analysis result indicating whether the text information is a first complete statement;
determine that the audio signal is not the speech end point when the first analysis result indicates that the text information is not the first complete statement; and
input the face image into the prediction model when the first analysis result indicates that the text information is the first complete statement.

20. A computer program product comprising computer-executable instructions that are stored on a non-transitory computer-readable medium and that, when executed by a processor, cause an apparatus to:
obtain an audio signal and a face image, wherein a first photographing time point of the face image is the same as a first collection time point of the audio signal;
input the face image into a prediction model to predict whether a user intends to continue speaking;
process the face image using the prediction model to obtain a prediction result;
output the prediction result; and
determine that the audio signal is a speech end point when the prediction result indicates that the user does not intend to continue speaking.

* * * * *

UNITED STATES PATENT AND TRADEMARK OFFICE
CERTIFICATE OF CORRECTION

PATENT NO. : 12,094,468 B2
APPLICATION NO. : 17/838500
DATED : September 17, 2024
INVENTOR(S) : Yi Gao, Weiran Nie and Youjia Huang It is certified that error appears in the above-identified patent and that said Letters Patent is hereby corrected as shown below:

In the Claims

Claim 10, Column 58, Line 7: "set, to obtain" should read "set to obtain"

Signed and Sealed this
Twenty-second Day of October, 2024

Katherine Kelly Vidal
*Director of the United States Patent and Trademark Office*